United States Patent
Iagnemma et al.

(10) Patent No.: US 11,711,681 B2
(45) Date of Patent: *Jul. 25, 2023

(54) IDENTIFYING A STOPPING PLACE FOR AN AUTONOMOUS VEHICLE

(71) Applicant: Motional AD LLC, Boston, MA (US)

(72) Inventors: Karl Iagnemma, Belmont, MA (US); Harshavardhan Ravichandran, Singapore (SG)

(73) Assignee: Motional AD LLC, Boston, MA (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/894,754

(22) Filed: Jun. 5, 2020

(65) Prior Publication Data

US 2020/0304974 A1    Sep. 24, 2020

Related U.S. Application Data

(63) Continuation of application No. 15/298,936, filed on Oct. 20, 2016, now Pat. No. 10,681,513.

(51) Int. Cl.
*H04W 4/70* (2018.01)
*G08G 1/01* (2006.01)
*G08G 1/0968* (2006.01)

(52) U.S. Cl.
CPC ............ *H04W 4/70* (2018.02); *G08G 1/0112* (2013.01); *G08G 1/0133* (2013.01); *G08G 1/0145* (2013.01); *G08G 1/096811* (2013.01)

(58) Field of Classification Search
CPC ..... H04W 4/70; G08G 1/0133; G08G 1/0145; G08G 1/0112; G08G 1/096811

USPC .......................................................... 701/25
See application file for complete search history.

(56) References Cited

U.S. PATENT DOCUMENTS

| | | | |
|---|---|---|---|
| 4,113,046 A | 9/1978 | Arpino | |
| 5,128,874 A | 7/1992 | Bhanu et al. | |
| 5,166,668 A | 11/1992 | Aoyagi | |
| 5,521,579 A | 5/1996 | Bernhard | |

(Continued)

FOREIGN PATENT DOCUMENTS

| | | |
|---|---|---|
| CN | 105652300 | 6/2016 |
| DE | 102013010983 | 1/2015 |

(Continued)

OTHER PUBLICATIONS

Aguiar et al., "Path-following for non-minimum phase systems removes performance limitations," IEEE Transactions on Automatic Control, 2005, 50(2):234-239.

(Continued)

*Primary Examiner* — Maceeh Anwari
(74) *Attorney, Agent, or Firm* — Fish & Richardson P.C.

(57) ABSTRACT

Among other things, stored data is maintained indicative of potential stopping places that are currently feasible stopping places for a vehicle within a region. The potential stopping places are identified as part of static map data for the region. Current signals are received from sensors or one or more other sources current signals representing perceptions of actual conditions at one or more of the potential stopping places. The stored data is updated based on changes in the perceptions of actual conditions. The updated stored data is exposed to a process that selects a stopping place for the vehicle from among the currently feasible stopping places.

9 Claims, 15 Drawing Sheets

(56) References Cited

U.S. PATENT DOCUMENTS

Figure 1:
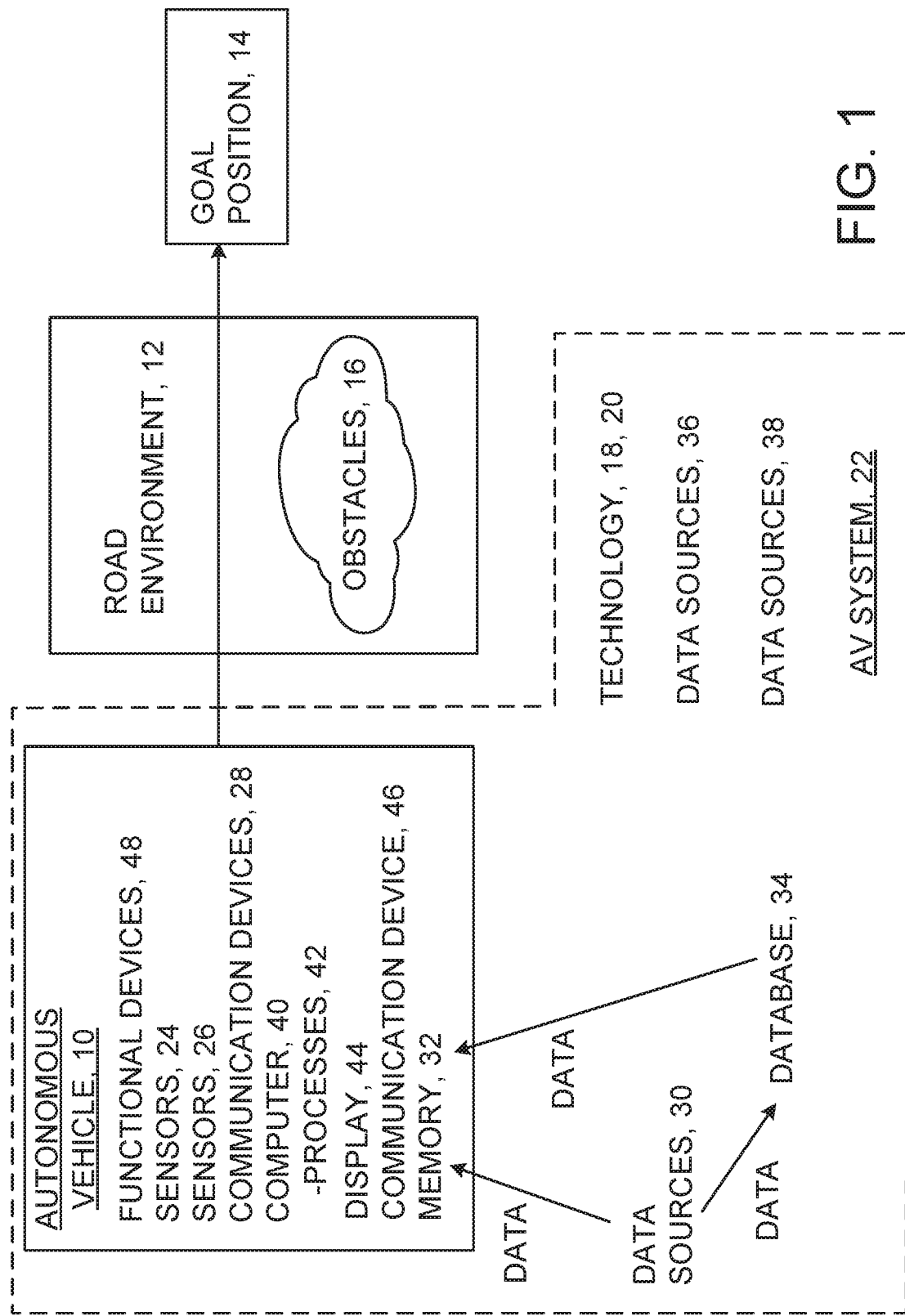

| | | |
|---|---|---|
| 5,913,917 A | 6/1999 | Murphy |
| 6,018,806 A | 1/2000 | Cortopassi et al. |
| 6,026,347 A | 2/2000 | Schuster |
| 6,067,501 A | 5/2000 | Vieweg |
| 6,126,327 A | 10/2000 | Bi et al. |
| 6,151,539 A | 11/2000 | Bergholz et al. |
| 6,188,602 B1 | 2/2001 | Alexander et al. |
| 6,320,515 B1 | 11/2001 | Olsson |
| 6,356,961 B1 | 3/2002 | Oprescu-Surcobe |
| 6,546,552 B1 | 4/2003 | Peleg |
| 6,768,813 B1 | 7/2004 | Nakayama |
| 6,782,448 B2 | 8/2004 | Goodman et al. |
| 6,836,657 B2 | 12/2004 | Ji et al. |
| 6,947,554 B2 | 9/2005 | Freyman et al. |
| 6,978,198 B2 | 12/2005 | Shi |
| 7,007,049 B2 | 2/2006 | Peng |
| 7,218,212 B1 | 5/2007 | Hu |
| 7,260,465 B2 | 8/2007 | Waldis et al. |
| 7,292,870 B2 | 11/2007 | Heredia et al. |
| 7,350,205 B2 | 3/2008 | Ji |
| 7,512,516 B1 | 3/2009 | Widmann |
| 7,512,673 B2 | 3/2009 | Miloushev et al. |
| 7,516,450 B2 | 4/2009 | Ogura |
| 7,562,360 B2 | 7/2009 | Tai et al. |
| 7,584,049 B2 | 9/2009 | Nomura |
| 7,587,433 B2 | 9/2009 | Peleg et al. |
| 7,642,931 B2 | 1/2010 | Sato |
| 7,657,885 B2 | 2/2010 | Anderson |
| 7,665,081 B1 | 2/2010 | Pavlyushchik |
| 7,668,871 B1 | 2/2010 | Cai et al. |
| 7,681,192 B2 | 3/2010 | Dietsch et al. |
| 7,734,387 B1 | 6/2010 | Young et al. |
| 7,802,243 B1 | 9/2010 | Feeser et al. |
| 7,805,720 B2 | 9/2010 | Chang et al. |
| 7,853,405 B2 | 12/2010 | Yamamoto |
| 7,865,890 B2 | 1/2011 | Sumi et al. |
| 7,890,427 B1 | 2/2011 | Rao et al. |
| 7,904,895 B1 | 3/2011 | Cassapakis et al. |
| 7,934,209 B2 | 4/2011 | Zimmer et al. |
| 7,941,656 B2 | 5/2011 | Hans et al. |
| 8,010,959 B2 | 8/2011 | Mullis et al. |
| 8,078,349 B1 | 12/2011 | Prada Gomez et al. |
| 8,095,301 B2 | 1/2012 | Kawamura |
| 8,112,165 B2 | 2/2012 | Meyer et al. |
| 8,145,376 B2 | 3/2012 | Sherony |
| 8,146,075 B2 | 3/2012 | Mahajan |
| 8,170,739 B2 | 5/2012 | Lee |
| 8,229,618 B2 | 7/2012 | Tolstedt et al. |
| 8,261,256 B1 | 9/2012 | Adler et al. |
| 8,266,612 B2 | 9/2012 | Rathi et al. |
| 8,271,972 B2 | 9/2012 | Braghiroli |
| 8,326,486 B2 | 12/2012 | Moinzadeh et al. |
| 8,375,108 B2 | 2/2013 | Aderton et al. |
| 8,392,907 B2 | 3/2013 | Oshiumi et al. |
| 8,397,230 B2 | 3/2013 | Ewington et al. |
| 8,428,649 B2 | 4/2013 | Yan et al. |
| 8,429,643 B2 | 4/2013 | Venkatachalam et al. |
| 8,437,890 B2 | 5/2013 | Anderson et al. |
| 8,457,827 B1 | 6/2013 | Ferguson et al. |
| 8,468,243 B2 | 6/2013 | Ogawa et al. |
| 8,495,618 B1 | 7/2013 | Inbaraj et al. |
| 8,516,142 B2 | 8/2013 | Lee et al. |
| 8,543,261 B2 | 9/2013 | Anderson et al. |
| 8,549,511 B2 | 10/2013 | Seki et al. |
| 8,578,361 B2 | 11/2013 | Cassapakis et al. |
| 8,612,153 B2 | 12/2013 | Nomura et al. |
| 8,612,773 B2 | 12/2013 | Nataraj et al. |
| 8,676,427 B2 | 3/2014 | Ferguson et al. |
| 8,706,394 B2 | 4/2014 | Trepagnier et al. |
| 8,744,648 B2 | 6/2014 | Anderson et al. |
| 8,781,707 B2 | 7/2014 | Kawawa et al. |
| 8,781,715 B2 | 7/2014 | Breed |
| 8,813,061 B2 | 8/2014 | Hoffman et al. |
| 8,880,270 B1 | 11/2014 | Ferguson et al. |
| 8,880,272 B1 | 11/2014 | Ferguson et al. |
| 8,996,234 B1 | 3/2015 | Tamari et al. |
| 9,008,961 B2 | 4/2015 | Nemec et al. |
| 9,045,118 B2 | 6/2015 | Taguchi et al. |
| 9,070,305 B1 | 6/2015 | Raman et al. |
| 9,081,383 B1 | 7/2015 | Montemerlo et al. |
| 9,090,259 B2 | 7/2015 | Dolgov et al. |
| 9,096,267 B2 | 8/2015 | Mudalige et al. |
| 9,097,549 B1 | 8/2015 | Rao et al. |
| 9,110,196 B2 | 8/2015 | Urmson et al. |
| 9,120,485 B1 | 9/2015 | Dolgov |
| 9,128,798 B2 | 9/2015 | Hoffman et al. |
| 9,139,199 B2 | 9/2015 | Harvey |
| 9,176,500 B1 | 11/2015 | Teller et al. |
| 9,187,117 B2 | 11/2015 | Spero et al. |
| 9,188,982 B2 | 11/2015 | Thomson |
| 9,196,164 B2 | 11/2015 | Urmson et al. |
| 9,202,382 B2 | 12/2015 | Klinger et al. |
| 9,218,739 B2 | 12/2015 | Trombley et al. |
| 9,243,537 B1 | 1/2016 | Ge |
| 9,314,924 B1 | 4/2016 | Laurent et al. |
| 9,321,461 B1 | 4/2016 | Silver |
| 9,348,577 B2 | 5/2016 | Hoffman et al. |
| 9,349,284 B2 | 5/2016 | Cudak et al. |
| 9,354,075 B2 | 5/2016 | Kim |
| 9,365,213 B2 | 6/2016 | Stenneth et al. |
| 9,399,472 B2 | 7/2016 | Minoiu-Enache |
| 9,412,280 B1 | 8/2016 | Zwillinger et al. |
| 9,465,388 B1 | 10/2016 | Fairfield et al. |
| 9,493,158 B2 | 11/2016 | Harvey |
| 9,519,290 B2 | 12/2016 | Kojo |
| 9,523,984 B1 | 12/2016 | Herbach |
| 9,534,910 B2 | 1/2017 | Okumura |
| 9,547,307 B1 | 1/2017 | Cullinane |
| 9,547,986 B1 | 1/2017 | Curlander et al. |
| 9,557,736 B1 | 1/2017 | Silver |
| 9,568,915 B1 | 2/2017 | Berntorp et al. |
| 9,587,952 B1 | 3/2017 | Slusar |
| 9,594,373 B2 | 3/2017 | Solyom et al. |
| 9,600,768 B1 | 3/2017 | Ferguson |
| 9,606,539 B1 | 3/2017 | Kentley et al. |
| 9,625,261 B2 | 4/2017 | Polansky |
| 9,625,906 B2 | 4/2017 | Meuleau et al. |
| 9,645,577 B1 | 5/2017 | Frazzoli et al. |
| 9,648,023 B2 | 5/2017 | Hoffman et al. |
| 9,671,785 B1 | 6/2017 | Bhatia et al. |
| 9,682,707 B1 | 6/2017 | Silver |
| 9,898,008 B2 | 2/2018 | Xu et al. |
| 9,910,440 B2 | 3/2018 | Wei et al. |
| 10,331,129 B2 | 6/2019 | Iagnemma et al. |
| 10,681,513 B2 | 6/2020 | Iagnemma |
| 2003/0043269 A1 | 3/2003 | Park |
| 2003/0060973 A1 | 3/2003 | Mathews et al. |
| 2003/0112132 A1 | 6/2003 | Trajkovic et al. |
| 2003/0125864 A1 | 7/2003 | Banno et al. |
| 2003/0125871 A1 | 7/2003 | Cherveny |
| 2004/0054995 A1 | 3/2004 | Lee |
| 2004/0093196 A1 | 5/2004 | Hawthorne et al. |
| 2004/0167702 A1 | 8/2004 | Isogai et al. |
| 2005/0065711 A1 | 3/2005 | Dahlgren et al. |
| 2005/0093720 A1 | 5/2005 | Yamane et al. |
| 2005/0134710 A1 | 6/2005 | Nomura et al. |
| 2005/0143889 A1 | 6/2005 | Isaji et al. |
| 2005/0206142 A1 | 9/2005 | Prakah-Asante et al. |
| 2005/0273256 A1 | 12/2005 | Takahashi |
| 2005/0283699 A1 | 12/2005 | Nomura et al. |
| 2006/0103590 A1 | 5/2006 | Divon |
| 2006/0174240 A1 | 8/2006 | Flynn |
| 2006/0195257 A1 | 8/2006 | Nakamura |
| 2006/0217939 A1 | 9/2006 | Nakate et al. |
| 2006/0242206 A1 | 10/2006 | Brezak et al. |
| 2007/0001831 A1 | 1/2007 | Raz et al. |
| 2007/0055446 A1 | 3/2007 | Schiffmann et al. |
| 2007/0061074 A1 | 3/2007 | Safoutin |
| 2007/0061779 A1 | 3/2007 | Dowedeit et al. |
| 2007/0087756 A1 | 4/2007 | Hoffberg |
| 2007/0124029 A1 | 5/2007 | Hattori |
| 2007/0142995 A1 | 6/2007 | Wotlermann |
| 2007/0162905 A1 | 7/2007 | Kooijmans |
| 2007/0185624 A1 | 8/2007 | Duddles et al. |

(56) References Cited

U.S. PATENT DOCUMENTS

| | | |
|---|---|---|
| 2007/0225900 A1 | 9/2007 | Kropp |
| 2007/0226726 A1 | 9/2007 | Robsahm |
| 2007/0229310 A1 | 10/2007 | Sato |
| 2007/0253261 A1 | 11/2007 | Uchida et al. |
| 2007/0255764 A1 | 11/2007 | Sonnier et al. |
| 2007/0265767 A1 | 11/2007 | Yamamoto |
| 2008/0001919 A1 | 1/2008 | Pascucci |
| 2008/0005733 A1 | 1/2008 | Ramachandran et al. |
| 2008/0046174 A1 | 2/2008 | Johnson |
| 2008/0071460 A1 | 3/2008 | Lu |
| 2008/0134165 A1 | 6/2008 | Anderson et al. |
| 2008/0140278 A1 | 6/2008 | Breed |
| 2008/0162027 A1 | 7/2008 | Murphy et al. |
| 2008/0184785 A1 | 8/2008 | Wee |
| 2008/0201702 A1 | 8/2008 | Bunn |
| 2008/0244757 A1 | 10/2008 | Nakagaki |
| 2008/0266168 A1 | 10/2008 | Aso et al. |
| 2008/0303696 A1 | 12/2008 | Aso et al. |
| 2009/0024357 A1 | 1/2009 | Aso et al. |
| 2009/0058677 A1 | 3/2009 | Tseng et al. |
| 2009/0062992 A1 | 3/2009 | Jacobs et al. |
| 2009/0070031 A1 | 3/2009 | Ginsberg |
| 2009/0079839 A1 | 3/2009 | Fischer et al. |
| 2009/0089775 A1 | 4/2009 | Zusman |
| 2009/0174573 A1 | 7/2009 | Smith |
| 2009/0177502 A1 | 7/2009 | Doinoff et al. |
| 2009/0237263 A1 | 9/2009 | Sawyer |
| 2009/0271084 A1 | 10/2009 | Taguchi |
| 2009/0312942 A1 | 12/2009 | Froeberg |
| 2010/0100268 A1 | 4/2010 | Zhang et al. |
| 2010/0198513 A1 | 8/2010 | Zeng et al. |
| 2010/0228419 A1 | 9/2010 | Lee et al. |
| 2010/0228427 A1 | 9/2010 | Anderson et al. |
| 2010/0256836 A1 | 10/2010 | Mudalige |
| 2010/0274430 A1 | 10/2010 | Dolgov et al. |
| 2010/0286824 A1 | 11/2010 | Solomon |
| 2010/0317401 A1 | 12/2010 | Lee et al. |
| 2011/0066312 A1 | 3/2011 | Sung et al. |
| 2011/0080302 A1 | 4/2011 | Muthaiah et al. |
| 2011/0102195 A1 | 5/2011 | Kushi et al. |
| 2011/0106442 A1 | 5/2011 | Desai et al. |
| 2011/0137549 A1 | 6/2011 | Gupta et al. |
| 2011/0141242 A1 | 6/2011 | Fernandez Alvarez et al. |
| 2011/0153166 A1 | 6/2011 | Yester |
| 2011/0184605 A1 | 7/2011 | Neff |
| 2011/0190972 A1 | 8/2011 | Timmons |
| 2011/0197187 A1 | 8/2011 | Roh |
| 2011/0231095 A1 | 9/2011 | Nakada et al. |
| 2011/0252415 A1 | 10/2011 | Ricci |
| 2011/0265075 A1 | 10/2011 | Lee |
| 2011/0307879 A1 | 12/2011 | Ishida et al. |
| 2012/0010797 A1 | 1/2012 | Luo et al. |
| 2012/0016581 A1 | 1/2012 | Mochizuki et al. |
| 2012/0017207 A1 | 1/2012 | Mahajan et al. |
| 2012/0078504 A1 | 3/2012 | Zhou |
| 2012/0109421 A1 | 5/2012 | Scarola |
| 2012/0110296 A1 | 5/2012 | Harata |
| 2012/0112895 A1 | 5/2012 | Jun |
| 2012/0124568 A1 | 5/2012 | Fallon et al. |
| 2012/0124571 A1 | 5/2012 | Nagai et al. |
| 2012/0140039 A1 | 6/2012 | Ota |
| 2012/0179362 A1 | 7/2012 | Stille |
| 2012/0242167 A1 | 9/2012 | Zeung et al. |
| 2012/0266156 A1 | 10/2012 | Spivak et al. |
| 2012/0268262 A1 | 10/2012 | Popovic |
| 2012/0271510 A1 | 10/2012 | Seymour et al. |
| 2012/0275524 A1 | 11/2012 | Lien et al. |
| 2012/0323402 A1 | 12/2012 | Murakami |
| 2013/0018572 A1 | 1/2013 | Jang |
| 2013/0046471 A1 | 2/2013 | Rahmes et al. |
| 2013/0054133 A1 | 2/2013 | Lewis et al. |
| 2013/0055231 A1 | 2/2013 | Hyndman et al. |
| 2013/0079950 A1 | 3/2013 | You |
| 2013/0085817 A1 | 4/2013 | Pinkus |
| 2013/0099911 A1 | 4/2013 | Mudalige et al. |
| 2013/0151058 A1 | 6/2013 | Zagorski et al. |
| 2013/0167131 A1 | 6/2013 | Carson |
| 2013/0174050 A1 | 7/2013 | Heinonen et al. |
| 2013/0184926 A1 | 7/2013 | Spero et al. |
| 2013/0223686 A1 | 8/2013 | Shimizu |
| 2013/0227538 A1 | 8/2013 | Maruyama |
| 2013/0238235 A1 | 9/2013 | Kitchel |
| 2013/0245877 A1 | 9/2013 | Ferguson et al. |
| 2013/0253754 A1 | 9/2013 | Ferguson et al. |
| 2013/0261952 A1 | 10/2013 | Aso et al. |
| 2013/0297172 A1 | 11/2013 | Ariga et al. |
| 2013/0304349 A1 | 11/2013 | Davidson |
| 2013/0304365 A1 | 11/2013 | Trombley et al. |
| 2013/0325241 A1 | 12/2013 | Lombrozo |
| 2013/0328916 A1 | 12/2013 | Arikan et al. |
| 2013/0332918 A1 | 12/2013 | Aoyagi et al. |
| 2013/0335569 A1 | 12/2013 | Einecke et al. |
| 2013/0338854 A1 | 12/2013 | Yamamoto |
| 2013/0339721 A1 | 12/2013 | Yasuda |
| 2014/0013015 A1 | 1/2014 | Chang |
| 2014/0018994 A1 | 1/2014 | Panzarella et al. |
| 2014/0059534 A1 | 2/2014 | Daum et al. |
| 2014/0062725 A1 | 3/2014 | Maston |
| 2014/0063232 A1 | 3/2014 | Fairfield et al. |
| 2014/0067488 A1 | 3/2014 | James et al. |
| 2014/0068594 A1 | 3/2014 | Young et al. |
| 2014/0088855 A1 | 3/2014 | Ferguson |
| 2014/0104077 A1 | 4/2014 | Engel et al. |
| 2014/0112538 A1 | 4/2014 | Ogawa et al. |
| 2014/0136414 A1 | 5/2014 | Anker |
| 2014/0149153 A1 | 5/2014 | Cassandras et al. |
| 2014/0156182 A1 | 6/2014 | Nemec et al. |
| 2014/0168377 A1 | 6/2014 | Cluff et al. |
| 2014/0176350 A1 | 6/2014 | Niehsen et al. |
| 2014/0195093 A1 | 7/2014 | Litkouhi et al. |
| 2014/0204209 A1 | 7/2014 | Huth et al. |
| 2014/0207325 A1 | 7/2014 | Mudalige et al. |
| 2014/0222280 A1 | 8/2014 | Salomonsson |
| 2014/0245285 A1 | 8/2014 | Krenz |
| 2014/0249742 A1 | 9/2014 | Krivacic et al. |
| 2014/0266665 A1 | 9/2014 | Haushalter |
| 2014/0272894 A1 | 9/2014 | Grimes et al. |
| 2014/0278052 A1 | 9/2014 | Slavin et al. |
| 2014/0278090 A1 | 9/2014 | Boes et al. |
| 2014/0288810 A1 | 9/2014 | Donovan et al. |
| 2014/0303827 A1 | 10/2014 | Dolgov et al. |
| 2014/0309856 A1 | 10/2014 | Willson-Quayle |
| 2014/0309885 A1 | 10/2014 | Ricci |
| 2014/0327532 A1 | 11/2014 | Park |
| 2014/0330479 A1 | 11/2014 | Dolgov et al. |
| 2014/0334168 A1 | 11/2014 | Ehlgen et al. |
| 2014/0334689 A1 | 11/2014 | Butler et al. |
| 2014/0371987 A1 | 12/2014 | Van Wiemeersch |
| 2015/0006012 A1 | 1/2015 | Kammek et al. |
| 2015/0012204 A1 | 1/2015 | Breuer et al. |
| 2015/0032290 A1 | 1/2015 | Kitahama et al. |
| 2015/0039211 A1 | 2/2015 | Stefan et al. |
| 2015/0046076 A1 | 2/2015 | Costrello |
| 2015/0051785 A1 | 2/2015 | Pal et al. |
| 2015/0081156 A1 | 3/2015 | Trepagnier et al. |
| 2015/0088357 A1 | 3/2015 | Yopp |
| 2015/0094943 A1 | 4/2015 | Yoshihama et al. |
| 2015/0100216 A1 | 4/2015 | Rayes |
| 2015/0120125 A1 | 4/2015 | Thomson et al. |
| 2015/0121071 A1 | 4/2015 | Schwarz |
| 2015/0123816 A1 | 5/2015 | Breed |
| 2015/0124096 A1 | 5/2015 | Koravadi |
| 2015/0134180 A1 | 5/2015 | An et al. |
| 2015/0149017 A1 | 5/2015 | Attard et al. |
| 2015/0154243 A1 | 6/2015 | Danaher |
| 2015/0154323 A1 | 6/2015 | Koch |
| 2015/0160024 A1 | 6/2015 | Fowe |
| 2015/0161895 A1 | 6/2015 | You et al. |
| 2015/0166069 A1 | 6/2015 | Engel et al. |
| 2015/0178998 A1 | 6/2015 | Attard et al. |
| 2015/0191135 A1 | 7/2015 | Noon et al. |
| 2015/0191136 A1 | 7/2015 | Noon et al. |
| 2015/0210274 A1 | 7/2015 | Clarke et al. |
| 2015/0219463 A1 | 8/2015 | Kang |

(56) References Cited

U.S. PATENT DOCUMENTS

| | | |
|---|---|---|
| 2015/0253778 A1 | 9/2015 | Rothoff et al. |
| 2015/0266488 A1 | 9/2015 | Solyom et al. |
| 2015/0268665 A1 | 9/2015 | Ludwich et al. |
| 2015/0279210 A1 | 10/2015 | Zafiroglu et al. |
| 2015/0285644 A1 | 10/2015 | Pfaff et al. |
| 2015/0292894 A1 | 10/2015 | Goddard et al. |
| 2015/0293534 A1 | 10/2015 | Takamatsu |
| 2015/0307131 A1 | 10/2015 | Froeschl et al. |
| 2015/0310744 A1 | 10/2015 | Farrelly et al. |
| 2015/0319093 A1 | 11/2015 | Stolfus |
| 2015/0329107 A1 | 11/2015 | Meyer et al. |
| 2015/0332101 A1 | 11/2015 | Takaki et al. |
| 2015/0336502 A1 | 11/2015 | Hillis et al. |
| 2015/0338849 A1 | 11/2015 | Nemec et al. |
| 2015/0339928 A1 | 11/2015 | Ramanujam |
| 2015/0345959 A1 | 12/2015 | Meuleau |
| 2015/0345966 A1 | 12/2015 | Meuleau |
| 2015/0345967 A1 | 12/2015 | Meuleau |
| 2015/0345971 A1 | 12/2015 | Meuleau et al. |
| 2015/0346724 A1 | 12/2015 | Jones et al. |
| 2015/0346727 A1 | 12/2015 | Ramanujam |
| 2015/0348112 A1 | 12/2015 | Ramanujam |
| 2015/0353082 A1 | 12/2015 | Lee et al. |
| 2015/0353085 A1 | 12/2015 | Lee et al. |
| 2015/0353094 A1 | 12/2015 | Harda et al. |
| 2015/0355641 A1 | 12/2015 | Choi et al. |
| 2015/0358329 A1 | 12/2015 | Noda et al. |
| 2015/0360692 A1 | 12/2015 | Ferguson et al. |
| 2015/0379468 A1 | 12/2015 | Harvey |
| 2016/0013934 A1 | 1/2016 | Smereka et al. |
| 2016/0016127 A1 | 1/2016 | Mentzel et al. |
| 2016/0016525 A1 | 1/2016 | Chauncey et al. |
| 2016/0025505 A1 | 1/2016 | Oh et al. |
| 2016/0033964 A1 | 2/2016 | Sato et al. |
| 2016/0041820 A1 | 2/2016 | Ricci et al. |
| 2016/0047657 A1 | 2/2016 | Caylor et al. |
| 2016/0047666 A1 | 2/2016 | Fuchs |
| 2016/0075333 A1 | 3/2016 | Sujan et al. |
| 2016/0078758 A1 | 3/2016 | Basalamah |
| 2016/0107655 A1 | 4/2016 | Desnoyer et al. |
| 2016/0109245 A1 | 4/2016 | Denaro |
| 2016/0117923 A1 | 4/2016 | Dannenbring |
| 2016/0121482 A1 | 5/2016 | Bostick et al. |
| 2016/0129907 A1 | 5/2016 | Kim et al. |
| 2016/0137199 A1 | 5/2016 | Kuhne et al. |
| 2016/0137206 A1 | 5/2016 | Chandraker et al. |
| 2016/0138924 A1 | 5/2016 | An |
| 2016/0139594 A1 | 5/2016 | Okumura et al. |
| 2016/0139598 A1 | 5/2016 | Ichikawa et al. |
| 2016/0139600 A1 | 5/2016 | Delp |
| 2016/0147921 A1 | 5/2016 | VanHolme |
| 2016/0148063 A1 | 5/2016 | Hong et al. |
| 2016/0161266 A1 | 6/2016 | Crawford et al. |
| 2016/0161270 A1 | 6/2016 | Okumura |
| 2016/0161271 A1 | 6/2016 | Okumura |
| 2016/0167652 A1 | 6/2016 | Slusar |
| 2016/0176398 A1 | 6/2016 | Prokhorov et al. |
| 2016/0180707 A1 | 6/2016 | MacNeille et al. |
| 2016/0209843 A1 | 7/2016 | Meuleau et al. |
| 2016/0231122 A1 | 8/2016 | Beaurepaire |
| 2016/0231746 A1 | 8/2016 | Hazelton et al. |
| 2016/0239293 A1 | 8/2016 | Hoffman et al. |
| 2016/0260328 A1 | 9/2016 | Mishra et al. |
| 2016/0266581 A1 | 9/2016 | Dolgov et al. |
| 2016/0280264 A1 | 9/2016 | Baek |
| 2016/0282874 A1 | 9/2016 | Kurata et al. |
| 2016/0288788 A1 | 10/2016 | Nagasaka |
| 2016/0291155 A1 | 10/2016 | Nehmadi et al. |
| 2016/0318437 A1 | 11/2016 | Vilakathara |
| 2016/0318531 A1 | 11/2016 | Johnson et al. |
| 2016/0321551 A1 | 11/2016 | Priness et al. |
| 2016/0332574 A1 | 11/2016 | Park et al. |
| 2016/0334229 A1 | 11/2016 | Ross et al. |
| 2016/0334230 A1 | 11/2016 | Ross et al. |
| 2016/0355192 A1 | 12/2016 | James et al. |
| 2016/0370194 A1 | 12/2016 | Colijn et al. |
| 2016/0370801 A1 | 12/2016 | Fairfield et al. |
| 2016/0379486 A1 | 12/2016 | Taylor |
| 2017/0010613 A1 | 1/2017 | Fukumoto |
| 2017/0016730 A1 | 1/2017 | Gawrilow |
| 2017/0059335 A1 | 3/2017 | Levine et al. |
| 2017/0059339 A1 | 3/2017 | Sugawara et al. |
| 2017/0082453 A1 | 3/2017 | Fischer et al. |
| 2017/0090480 A1 | 3/2017 | Ho et al. |
| 2017/0106871 A1 | 4/2017 | You et al. |
| 2017/0110022 A1 | 4/2017 | Gulash |
| 2017/0113683 A1 | 4/2017 | Mudalige et al. |
| 2017/0122766 A1 | 5/2017 | Nemec et al. |
| 2017/0123429 A1 | 5/2017 | Levinson et al. |
| 2017/0123430 A1 | 5/2017 | Nath et al. |
| 2017/0139701 A1 | 5/2017 | Lin et al. |
| 2017/0153639 A1 | 6/2017 | Stein |
| 2017/0154225 A1 | 6/2017 | Stein |
| 2017/0219371 A1 | 8/2017 | Suzuki et al. |
| 2017/0242436 A1 | 8/2017 | Creusot |
| 2017/0245151 A1 | 8/2017 | Hoffman et al. |
| 2017/0248949 A1 | 8/2017 | Moran et al. |
| 2017/0249848 A1 | 8/2017 | Niino et al. |
| 2017/0276502 A1 | 9/2017 | Fischer et al. |
| 2017/0277193 A1 | 9/2017 | Frazzoli et al. |
| 2017/0277194 A1 | 9/2017 | Frazzoli et al. |
| 2017/0277195 A1 | 9/2017 | Frazzoli et al. |
| 2017/0286784 A1 | 10/2017 | Bhatia et al. |
| 2017/0291608 A1 | 10/2017 | Engel et al. |
| 2017/0292843 A1 | 10/2017 | Wei et al. |
| 2017/0305335 A1 | 10/2017 | Wei et al. |
| 2017/0309179 A1 | 10/2017 | Kodama |
| 2017/0132334 A1 | 11/2017 | Levinson et al. |
| 2017/0327128 A1 | 11/2017 | Denaro |
| 2017/0336788 A1 | 11/2017 | Iagnemma |
| 2017/0337819 A1 | 11/2017 | Wei et al. |
| 2017/0341652 A1 | 11/2017 | Sugawara et al. |
| 2017/0345321 A1 | 11/2017 | Cross et al. |
| 2017/0349181 A1 | 12/2017 | Wei et al. |
| 2017/0351263 A1 | 12/2017 | Lambermount et al. |
| 2017/0356746 A1 | 12/2017 | Iagnemma |
| 2017/0356747 A1 | 12/2017 | Iagnemma |
| 2017/0356748 A1 | 12/2017 | Iagnemma |
| 2017/0356750 A1 | 12/2017 | Iagnemma |
| 2017/0356751 A1 | 12/2017 | Iagnemma |
| 2017/0369051 A1 | 12/2017 | Sakai et al. |
| 2018/0004206 A1 | 1/2018 | Iagnemma et al. |
| 2018/0004210 A1 | 1/2018 | Iagnemma et al. |
| 2018/0039269 A1 | 2/2018 | Lambermount et al. |
| 2018/0050664 A1 | 2/2018 | Tarte |
| 2018/0053276 A1 | 2/2018 | Iagnemma et al. |
| 2018/0053412 A1 | 2/2018 | Iagnemma et al. |
| 2018/0086280 A1 | 3/2018 | Nguyen |
| 2018/0105174 A1 | 4/2018 | Russell et al. |
| 2018/0113455 A1 | 4/2018 | Iagnemma et al. |
| 2018/0113456 A1 | 4/2018 | Iagnemma et al. |
| 2018/0113457 A1 | 4/2018 | Iagnemma et al. |
| 2018/0113459 A1 | 4/2018 | Bennie et al. |
| 2018/0113463 A1 | 4/2018 | Iagnemma et al. |
| 2018/0113470 A1 | 4/2018 | Iagnemma et al. |
| 2018/0114442 A1 | 4/2018 | Minemura et al. |
| 2018/0120845 A1 | 5/2018 | Lambermount et al. |
| 2018/0120859 A1 | 5/2018 | Eagelberg et al. |
| 2020/0304974 A1 | 9/2020 | Iagnemma et al. |

FOREIGN PATENT DOCUMENTS

| | | |
|---|---|---|
| EP | 0436213 | 7/1991 |
| EP | 2381361 | 10/2011 |
| EP | 2639781 | 9/2013 |
| EP | 2955077 | 12/2015 |
| EP | 2982562 | 2/2016 |
| JP | 2005-189983 | 7/2005 |
| JP | 2009-102003 | 5/2009 |
| JP | 2009-251759 | 10/2009 |
| JP | 2010-086269 | 4/2010 |
| JP | 2011-253379 | 12/2011 |
| JP | 5090937 | 12/2012 |
| JP | 2013-242737 | 12/2013 |

(56) References Cited

FOREIGN PATENT DOCUMENTS

| JP | 2015-044432 | 3/2015 |
|---|---|---|
| JP | 2016-095627 | 5/2016 |
| JP | 2018-012478 | 1/2018 |
| KR | 10-2013-0085235 | 7/2013 |
| KR | 10-2014-0069749 | 6/2014 |
| KR | 10-2014-0130968 | 11/2014 |
| KR | 10-1480652 | 1/2015 |
| KR | 10-1590787 | 2/2016 |
| KR | 2016-0049017 | 5/2016 |
| WO | WO 2007053350 | 5/2007 |
| WO | WO 2009156186 | 12/2009 |
| WO | WO2009156186 A2 * | 12/2009 |
| WO | WO 2014139821 | 9/2014 |
| WO | WO 2015008032 | 1/2015 |
| WO | WO 2015151055 | 10/2015 |
| WO | WO 2016018636 | 2/2016 |
| WO | WO 2017205278 | 11/2017 |
| WO | WO 2017218563 | 12/2017 |
| WO | WO 2018005819 | 1/2018 |

OTHER PUBLICATIONS

Aguiar et al., "Trajectory-tracking and path-following of under-actuated autonomous vehicles with parametric modeling uncertainty," Transactions on Automatic Control, 2007, 52(8):1362-1379.

Amidi and Thorpe, "Integrated mobile robot control," International Society for Optics and Photonics, Boston, MA, 1991, 504-523.

Aoude et al., "Mobile agent trajectory prediction using Bayesian nonparametric reachability trees," American Institute of Aeronautics and Astronautics, 2011, 1587-1593.

Autoliv.com [online], "Vision Systems—another set of "eyes"," available on or before Sep. 8, 2012, retrieved Oct. 20, 2016,<https://www.autoliv.com/ProductsAndInnovations/ActiveSafetySystems/Pages/VisionSystems.aspx>, 2 pages.

Autonomoustuff.com [online], "ibeo Standard Four Layer Multi-Echo LUX Sensor: Bringing together the World's Best Technologies," available on or before Jul. 2016, retrieved on Feb. 7, 2017, <http://www.autonomoustuff.com/product/ibeo-lux-standard/>, 2 pages.

Bahlmann et al., "A system for traffic sign detection, tracking, and recognition using color, shape, and motion information," IEEE Intelligent Vehicles Symposium, 2005, 255-260.

Balabhadruni, "Intelligent traffic with connected vehicles: intelligent and connected traffic systems," IEEE International Conference on Electrical, Electronics, Signals, Communication, and Optimization, 2015, 2 pages (Abstract Only).

Bertozzi et al., "Stereo inverse perspective mapping: theory and applications" Image and Vision Computing, 1999, 16:585-590.

Betts, " A survey of numerical methods for trajectory optimization," AIAA Journal of Guidance, Control, and Dynamics, Mar.-Apr. 1998, 21(2):193-207.

Bosch-presse.de [online], "Connected horizon—seeing beyond the bends ahead," Bosch: Invented for Life, available on or before Oct. 2015, retrieved on Nov. 3, 2016, < http://www.bosch-presse.de/pressportal/en/connected-horizon---seeing-beyond-the-bends-ahead-35691.html>, 2 pages.

Castro et al., "Incremental Sampling-based Algorithm for Minimum-violation Motion Planning", Decision and Control, IEEE 52nd Annual Conference, Dec. 2013, 3217-3224.

Chaudari et al., "Incremental Minimum-Violation Control Synthesis for Robots Interacting with External Agents," American Control Conference, Jun. 2014, <http //vision.ucla.edu/~pratikac/pub/chaudhari.wongpiromsam.ea.acc14.pdf>, 1761-1768.

Chen et al., "Likelihood-Field-Model-Based Dynamic Vehicle Detection and Tracking for Self-Driving," IEEE Transactions on Intelligent Transportation Systems, Nov. 2016, 17(11):3142-3158.

D'Andrea-Novel et al., "Control of Nonholonomic Wheeled Mobile Robots by State Feedback Linearization," The International Journal of Robotics Research, Dec. 1995, 14(6):543-559.

De la Escalera et al., "Road traffic sign detection and classification," IEEE Transactions on Industrial Electronics, Dec. 1997, 44(6):848-859.

Delphi.com [online], "Delphi Electronically Scanning Radar: Safety Electronics," retrieved on Feb. 7, 2017, <http://delphi.com/manufacturers/auto/safety/active/electronically-scanning-radar>, 4 pages.

Demiris, "Prediction of intent in robotics and multi-agent systems." Cognitive Processing, 2007, 8(3):151-158.

Dolgov et al. "Path Planning for Autonomous Vehicles in Unknown Semi-structured Environments," International Journal of Robotics Research, 2010, 29(5):485-501.

Dominguez et al., "An optimization technique for positioning multiple maps for self-driving car's autonomous navigation," IEEEE International Conference on Intelligent Transportation Systems, 2015, 2694-2699.

Fairfield and Urmson, "Traffic light mapping and detection," In Proceedings of the International Conference on Robotics and Automation (ICRA), 2011, 6 pages.

Falcone et al., "A linear time varying model predictive control approach to the integrated vehicle dynamics control problem in autonomous systems," IEEE Conference on Decision and Control, 2007, 2980-2985.

Falcone et al., "A Model Predictive Control Approach for Combined Braking and Steering in Autonomous Vehicles", Ford Research Laboratories, Mediterranean Conference on Control & Automation, 2007, <http;//www.me.berkeley.edu/~frborrel/pdfpub/pub-20.pdf>, 6 pages.

Fong et al., "Advanced Interfaces for Vehicle Teleoperation: Collaborative Control Sensor Fusion Displays, and Remote Driving Tools", Autonomous Robots 11, 2001, 77-85.

Franke et al., "Autonomous driving goes downtown," IEEE Intelligent Systems and their Applications, 1998, 6:40-48.

Fraser, "Differential Synchronization," ACM: DocEng '09, Sep. 2009, <https://static.googleusercontent.com/media/research.google.com/en//pubs/archive/35605.pdl>, 13-20.

Garcia et al., "Model predictive control: theory and practice—a survey," Automatica, 1989, 25(3):335-348.

Gavrila and Philomin, "Real-time object detection for "smart" vehicles," In Proceedings of the Seventh IEEE International Conference on Computer Vision, 1999, 1:87-93.

Golovinsky et al., "Shape-based Recognition of 3D Point Clouds in Urban Environments," Proceedings of the 12th International Conference on Computer Vision, 2009, 2154-2161.

Hammerschmidt, "Bosch to Focus on Cloud for Connected Car Services", EE Times Europe, Dec. 2015, retrieved on Aug. 25, 2016, ,http://www.electronics-eetimes.com/news/bosch-focus-cloud-connected-car-services>, 4 pages.

He et al., "Color-Based Road Detection in Urban Traffic Scenes," IEEE Transactions on Intelligent Transportation Systems, Dec. 2004, 5(4):309-318.

Himmelsback et al., "Fast Segmentation of 3D Point Clouds for Ground Vehicles," IEEE Intelligent Vehicles Symposium, Jul. 21-24, 2010, 6 pages.

IEEE Global Initiative for Ethical Consideration in Artificial Intelligence and Autonomous Systems, "Ethically Aligned Design: A Vision for Prioritizing Human Wellbeing with Artificial Intelligence and Autonomous Systems," IEEE Advancing Technology for Humanity, Dec. 13, 2016, 138 pages.

ISO.org, "ISO 14229-1:2006; Road Vehicles—Unified diagnostic services (UDS)—Part 1: Specification and requirements," International Standard Organization, 2006, retrieved on Apr. 4, 2018, <https://www.iso.org/standard/45293.html>, 2 pages (abstract).

ISO.org, "ISO 15765-3:2004; Road Vehicles—Diagnostics on Controller Area Networks (CAN)—Part 3: Implementation of unified diagnostic services (UDS on CAN)," International Standard Organization, Oct. 2004, retrieved on Apr. 4, 2018, <https://www.iso.org/obp/ui/#iso:std:iso:14229:-1:ed-1:v2:en>, 2 pages (abstract).

Jiang and Nijmeijer, "Tracking control of mobile robots: a case study in backstepping," Automatica, 1997, 33(7):1393-1399.

Kala, et al: "Motion Planning of Autonomous Vehicles on a Dual Carriageway without Speed Lanes", Electronics, Jan. 13, 2015 4(1):59-81.

(56) References Cited

OTHER PUBLICATIONS

Kanayama, "A Stable Tracking Control Method for an Autonomous Mobile Robot," International Conference on Robotics and Automation, 1990, 384-389.

Karaman and Frazzoli, "Sampling-based algorithms for optimal motion planning." Int. Journal of Robotics Research, Jun. 2011, <http://ares.lids.mit.edu/papers/Karaman.Frazzoli.IJRR11.pdf>, 30(7):846-894.

Karaman et al., "Sampling-based Algorithms for Optimal Motion Planning with Deterministic—Calculus Specifications", 2012 American Control Conference, Jun. 27-Jun. 29, 2012, 8 pages.

Kavraki et al., "Probabilistic roadmaps for path planning in high-dimensional configuration spaces." IEEE Transactions on Robotics and Automation, 1996, 12(4):566-580.

Kessels et al., "Electronic Horizon: Energy Management using Telematics Information", IEEE: Vehicle Power and Propulsion Conference, 2007, 6 pages.

Kim, "Robust lane detection and tracking in challenging scenarios." IEEE Transactions on Intelligent Transportation Systems, 2008, 9(1):16-26.

Larson et al., "Securing Vehicles against Cyber Attacks," ACM, 2008, retrieved on [date], <http://dl.acm.org/citation.cfm?id=1413174>, 3 pages.

Lindner et al., "Robust recognition of traffic signals," IEEE Intelligent Vehicles Symposium, 2004, 5 pages.

Liu et al., "Nonlinear Stochastic Predictive Control with Unscented Transformation for Semi Autonomous Vehicles," American Control Conference, Jun. 4-6, 2014, 5574-5579.

Liu et al., "Robust semi-autonomous vehicle control for roadway departure and obstacle avoidance," ICCAS, Oct. 20-23, 2013, 794-799.

Lobdell, "Robust Over-the-air Firmware Updates Using Program Flash Memory Swap on Kinetis Microcontrollers," Freescal Semiconductor Inc., 2012, retrieved on Apr. 11, 2018, <http://cache.freescale.com/flies/microcontrollers/doc/app_note/AN4533.pdf>, 20 pages.

Luzcando (searcher), "EIC 3600 Search Report," STIC—Scientific & Technical Information Center, Feb. 14, 2018, 20 pages.

Maldonado-Bascón et al., "Road-sign detection and recognition based on support vector machines," IEEE Transactions on Intelligent Transportation Systems, 2007, 8(2):264-278.

Mayne et al., "Constrained model predictive control: Stability and optimality," Automatica, 2000, 36(6):789-814.

Mobileye [online], "Advanced Driver Assistance Systems (ADAS) systems range on the spectrum of passive/active," Copyright 2017, retrieved on Oct. 20, 2016, <http://www.mobileye.com/our-technology/adas/>, 2 pages.

Møgelmose et al., "Vision-based traffic sign detection and analysis for intelligent driver assistance systems: Perspectives and survey," IEEE Transactions on Intelligent Transportation Systems, 2012, 13(4):1484-1497.

Morris et al., "Learning, modeling, and classification of vehicle track patterns from live video." IEEE Transactions on Intelligent Transportation Systems, 2008, 9(3):425-437.

Nilsson et al., "A Framework for Self-Verification of Firmware Updates over the Air in Vehicle ECUs," IEEE: GLOBECOM Workshops, Nov. 2008, 5 pages.

Nilsson et al., "Conducting Forensic Investigations of Cyber Attacks on Automobiles In-Vehicle Networks," ICST, 2008, retrieved on Mar. 20, 2016, <http://dl.acm.org/citation.cfm?id=1363228>, 6 pages.

Ollero and Amidi, "Predictive path tracking of mobile robots, application to the CMU Navlab," in 5th International Conference on Advanced Robotics, 1991, 91:1081-1086.

Paik et al., "Profiling-based Log Block Replacement Scheme in FTL for Update-intensive Executions," IEEE: Embedded and Ubiquitous Computing (EUC), Oct. 2011, 182-188.

Ponomarev, "Augmented reality's future isn't glasses. It's the car," Venturebeat.com, available on or before, Aug. 2017, retrieved on Mar. 30, 2018, <https://venturebeat.com/2017/08/23/ar-will-drive-the-evolution-of-automated-cars/>, 4 pages.

Premebida et al., "A lidar and vision-based approach for pedestrian and vehicle detection and tracking." In Proceedings of the IEEE Intelligent Transportation Systems Conference, 2007, 1044-1049.

Premebida et al., "LIDAR and vision-based pedestrian detection system." Journal of Field Robotics, 2009, 26(9):696-711.

Rankin et al., "Autonomous path planning navigation system used for site characterization," SPIE—International Society for Optics and Photonics, 1996, 176-186.

Shavel-Shwartz et al., "Avoiding a "Winter of Autonomous Driving": On a Formal Model of Safe, Scalable, Self-driving Cars," arXiv preprint, Aug. 17, 2017, 25 pages.

Shen et al., "A Robust Video based Traffic Light Detection Algorithm for Intelligent Vehicles," Proceedings of the IEEE Intelligent Vehicles Symposium, 2009, 521-526.

Shin, "Hot/Cold Clustering for Page Mapping in NAND Flash Memory," IEEE: Transactions on Consumer Electronics, Nov. 2011, 57(4):1728-1731.

Spieser et al, "Toward a systematic approach to the design and evaluation of automated mobility-on-demand systems: A case study in Singapore," Road Vehicle Automation, 2014, 229-245.

Standards.sae.org, "Taxonomy and Definitions for Terms Related to Driving Automation Systems for On-Road Motor Vehicles," SAE International, Sep. 2016, retrieved on Apr. 18, 2017, <http://standards.sae.org/j3016_201609/>, 3 pages.

Steger et al, "Applicability of IEEE 802.11s for Automotive Wireless Software Updates," IEEE: Telecommunications (ConTEL), Jul. 2015, 8 pages.

Stokar, "Perform over-the-air updates for car ECUss," eMedia Asia Ltd., 2013, retrieved on Apr. 11, 2018, <http://www.eetasia.com/STATIC/PDF/201312/EEOL_2013DEC05_NET_EMS_TA_01.pdf?SOURCES=DOWNLOAD>, 3 pages.

Strahn et al., "Laser Scanner-Based Navigation for Commercial Vehicles," IEEE Intelligent Vehicles Symposium, Jun. 13-15, 2007, 969-974.

Tabuada and Pappas, "Linear time logic control of discrete-time linear systems," IEEE Transactions on Automatic Control, 2006, 51(12):1862-1877.

Wallace et al., "First results in robot road-following," in IJCAI, 1985, 1089-1095.

Wang et al., "Lane detection and tracking using B-Snake," Image and Vision Computing, 2004, 22(4):269-280.

Wang et al., "Simultaneous localization, mapping and moving object tracking," The International Journal of Robotics Research, 2007, 26(9):889-916.

Weiskircher et al., "Predictive Guidance and Control Framework for (Semi-) Autonomous Vehicles in Public Traffic," IEEE Transactions on Control Systems Technology, 2017, 25(6):2034-2046.

Weiss et al., "Autonomous v. Tele-operated: How People Perceive Human-Robot Collaboration with HRP-2," Proceedings of the 4th ACM/IEEE international conference on Human robot interaction, 2009, 3 pages.

Wikipedia.org [online],"Gain Scheduling", Aug. 20, 2006 (first draft), retrieved on Aug. 25, 2016, <https://en.wikipedia.org/wiki/Gain_scheduling>, 1 page.

Wit et al., "Autonomous ground vehicle path tracking," Journal of Robotic Systems, 2004, 21(8):439-449.

Wu et al., "Data Sorting in Flash Memory," ACM, 2015, <http://dl.acm.org/citation.cfm?id=2747982.2665067>, 25 pages.

Yilmaz et al., "Object tracking: A survey," ACM Computing Surveys, 2006, 31 pages.

Zax, "A Software Update for Your Car? Ford reboots it infotainment system, following consumer complaints," MIT Technology Review, 2012, retrieved on Apr. 11, 2018, <http://www.technologyreview.com/view/427153/a-software-update-for-yourcar?/>, 6 pages.

Zheng et al, "Lane-level positioning system based on RFID and vision," IET International Conference on Intelligent and Connected Vehicles, 2016, 5 pages.

U.S. Appl. No. 15/298,935, filed Oct. 20, 2016, Iagnemma et al.
U.S. Appl. No. 15/298,984, filed Oct. 20, 2016, Iagnemma et al.
U.S. Appl. No. 15/298,936, filed Oct. 20, 2016, Iagnemma et al.

(56) References Cited

OTHER PUBLICATIONS

U.S. Appl. No. 15/298,970, filed Oct. 20, 2016, Iagnemma et al.
U.S. Appl. No. 15/299,028, filed Oct. 20, 2016, Iagnemma et al.

* cited by examiner

Defining the goal region

The trajectory planning process

IDENTIFYING A STOPPING PLACE FOR AN AUTONOMOUS VEHICLE

CROSS-REFERENCE TO RELATED APPLICATION

This disclosure is a continuation of and claims priority to U.S. patent Ser. No. 15/298,936, filed Oct. 20, 2016, the entire contents of which are incorporated herein by reference.

TECHNICAL FIELD

This description relates to identifying stopping places for an autonomous vehicle.

BACKGROUND

As shown in FIG. 1, a typical activity of an autonomous vehicle (AV) 10 is to safely and reliably drive through a road environment 12 to a goal position 14, while avoiding vehicles, pedestrians, cyclists and other obstacles 16 and obeying the rules of the road. We sometimes refer to the AV's ability to perform this activity as an "autonomous driving capability".

The autonomous driving capability of an AV typically is supported by an array of technology 18, 20 including hardware, software, and stored and real time data that we together sometimes refer to as an AV system 22. Some or all of the technology is onboard the AV and some of the technology may be at a server, for example, in the cloud. Most AV systems include some or all of the following basic components:

1. Sensors 24 able to measure or infer or both properties of the AV's state and condition, such as the vehicle's position, linear and angular velocity and acceleration, and heading (i.e., orientation of the leading end of the AV). Such sensors include but are not limited to, e.g., GPS, inertial measurement units that measure both vehicle linear accelerations and angular rates, individual wheel speed sensors and derived estimates of individual wheel slip ratios, individual wheel brake pressure or braking torque sensors, engine torque or individual wheel torque sensors, and steering wheel angle and angular rate sensors.

2. Sensors 26 able to measure properties of the vehicle's surroundings. Such sensors include but are not limited to, e.g., LIDAR, RADAR, monocular or stereo video cameras in the visible light, infrared, or thermal spectra, ultrasonic sensors, time-of-flight (TOF) depth sensors, as well as temperature and rain sensors.

3. Devices 28 able to communicate the measured or inferred or both properties of other vehicles' states and conditions, such as other vehicles' positions, linear and angular velocities, and accelerations, and headings. These devices include Vehicle-to-Vehicle (V2) and Vehicle-to-Infrastructure (V2I) communication devices, and devices for wireless communications over point-to-point or ad-hoc networks or both. The devices can operate across the electromagnetic spectrum (including radio and optical communications) or other media (e.g., acoustic communications).

4. Data sources 30 providing historical, real-time, or predictive information or combinations of them about the local environment, including traffic congestion updates and weather conditions. Such data may be stored on a memory storage unit 32 on the vehicle or transmitted to the vehicle by wireless communication from a remotely located database 34.

5. Data sources 36 providing digital road map data drawn from GIS databases, potentially including high-precision maps of the roadway geometric properties, maps describing road network connectivity properties, maps describing roadway physical properties (such as the number of vehicular and cyclist travel lanes, lane width, lane traffic direction, lane marker type and location), and maps describing the spatial locations of road features such as crosswalks, traffic signs of various types (e.g., stop, yield), and traffic signals of various types (e.g., red-yellow-green indicators, flashing yellow or red indicators, right or left turn arrows). Such data may be stored on a memory storage unit on the AV or transmitted to the AV by wireless communication from a remotely located database.

6. Data sources 38 providing historical information about driving properties (e.g., typical speed and acceleration profiles) of vehicles that have previously traveled along the local road section at a similar time of day. Such data may be stored on a memory storage unit on the AV or transmitted to the AV by wireless communication from a remotely located database.

7. A computer system 40 located on the AV that is capable of executing algorithms (e.g., processes 42) for the on-line (that is, real-time on board) generation of control actions based on both real-time sensor data and prior information, allowing an AV to execute its autonomous driving capability.

8. A display device 44 that is connected to the computer system to provide information and alerts of various types to occupants of the AV.

9. A wireless communication device 46 to transmit data from a remotely located database 34 to the AV and to transmit vehicle sensor data or data related to driver performance to a remotely located database 34.

10. Functional devices and features 48 of the AV that are instrumented to receive and act on commands for driving (e.g., steering, acceleration, deceleration, gear selection) and for auxiliary functions (e.g., turn indicator activation) from the computer system.

11. A memory 32.

SUMMARY

In general, in an aspect, a vehicle is caused to drive autonomously through a road network toward a defined goal position. Current information is analyzed about potential stopping places in the vicinity of the goal position, to make a choice of a currently selected stopping place that is acceptable and feasible. The vehicle is caused to drive autonomously toward the currently selected stopping place. The activities are repeated until the vehicle stops at a currently selected stopping place.

Implementations may include one or a combination of two or more of the following features. The analyzing of current information includes analyzing a combination of static information that is known prior to the vehicle beginning to drive autonomously through the road network and information that is obtained during the autonomous driving. The analyzing of current information about potential stopping places includes continuously analyzing information from sensors on the vehicle or information from one or more other sources or both. The analyzing of current information about potential stopping places includes applying a predefined strategy for choosing a currently selected stopping place. The strategy includes stopping at the first feasible stopping place in the vicinity of the goal position. The strategy includes stopping at the most desirable among the currently feasible stopping places in the vicinity of the goal position. The strategy includes, if the vehicle has not stopped at a currently selected stopping place within a specified period of time, stopping at the first available stopping place in the vicinity of the goal position. The strategy includes trading off between choosing a best possible stopping place and a cost incurred in continuing to analyze current information to make a choice. If the vehicle has not stopped at a currently selected stopping place, the activities are repeated using a relaxed threshold for acceptability, a relaxed threshold for feasibility, or both. If the vehicle has not stopped at a currently selected stopping place that is acceptable and feasible, the activities are repeated based on a redefined goal position. If the vehicle has not stopped at a currently selected stopping place, the activities are repeated based on an expanded vicinity of the goal position. If the vehicle has not stopped at a currently selected stopping place, the activities are repeated during an extended period of time beyond the specified amount of time. If the vehicle has not stopped at a currently selected stopping place, the vehicle is enabled to be controlled from a remote location. If the vehicle has not stopped at a currently selected stopping place, the stop is aborted. If the vehicle has not stopped at a currently selected stopping place, a threshold for acceptability is relaxed, the goal position is redefined, or the stop is aborted the stop, based on information provided by a passenger. If the vehicle has not stopped at a currently selected stopping place, a threshold for acceptability is automatically relaxed, the goal position is automatically redefined, or the stop is automatically aborting. The analyzing of current information includes analyzing map data about the road network. The analyzing of current information includes analyzing information about features in the vicinity of the goal position as perceived by sensors. The sensors are on the vehicle. The analyzing of current information includes analyzing distances of respective stopping places from the goal position. The analyzing of current information includes analyzing information about respective positions of the vehicle at the potential stopping places. The analyzing of current information includes analyzing information about whether the vehicle can legally stop at the potential stopping places. The analyzing of current information includes analyzing relative desirability of potential stopping places. The analyzing relative desirability of potential stopping places includes applying a statistical model to predict an expected feasibility state of a stopping place based on historical statistics of level of demand for parking and current traffic volumes. The analyzing of current information includes identifying a set of potential stopping places that are within a proximity region in the vicinity of the goal position. The analyzing of current information includes removing potential stopping places from the set that are not feasible stopping places for the vehicle. If no potential stopping places remain after the removing, the proximity region is enlarged. There may be no stopping place that is currently acceptable. Current information is analyzed about additional potential stopping places in the vicinity of the goal position to make a choice of a currently selected stopping place that is acceptable and feasible. The additional potential stopping places lie within a larger vicinity of the goal position. The larger vicinity is determined based on information provided by a passenger of the vehicle. The larger vicinity is determined automatically based on pre-specified rules. The size of the larger vicinity is less than a predetermined upper limit.

In general, in an aspect, and autonomous vehicle includes steering, acceleration, and deceleration devices that respond to signals from an autonomous driving control system to drive the vehicle autonomously on a specified route through a road network defined by map data and toward a specified goal position. Sensors on the vehicle perceive characteristics of potential stopping places in the vicinity of the goal position. A communication feature sends the currently perceived characteristics to the autonomous driving control system and receives from the autonomous driving control system current information indicative of commands for the steering, acceleration, and deceleration devices to cause the vehicle to drive to and stop at a currently selected stopping place.

Implementations may include one or a combination of two or more of the following features. The autonomous driving control system includes elements onboard the vehicle. The autonomous driving control system includes elements remote from the vehicle. The sensors on the vehicle include video capture, LIDAR, or RADAR devices. The current information received from the autonomous driving control system includes a continuously updated choice of a selected stopping place.

In general, in an aspect, a planning process is associated with an autonomous vehicle. The planning process has inputs including static map data and dynamic data from sensors on the autonomous vehicle and outputs including a route to be driven through a road network to reach a goal position, a continually updated choice of a currently selected stopping place in the vicinity of the goal position, and a trajectory to be executed through a road network to reach the currently selected stopping place. A communication element communicates information about the updated choice of a currently selected stopping place to a device of a passenger, receives from the device of the passenger information about the goal position, and delivers the information to the planning process as an input.

Implementations may include one or a combination of two or more of the following features. The currently selected stopping place is updated based on non-feasibility of a currently selected stopping place. The planning process updates the selection of a stopping place based on the information from the device of the passenger about the stopping place. The communication element communicates to the device of the passenger that the planning process has selected a stopping place. The information received from the device of the passenger includes an indication that a stopping place farther from the goal position would be acceptable. The information received from the device of the passenger includes an indication of a maximum acceptable distance. The information received from the device of the passenger includes an indication of a new goal position to be considered by the planning process. The information received from the device of the passenger includes an indication that further time spent searching for an acceptable stopping place would be acceptable to the passenger.

In general, in an aspect, stored data is maintained indicative of potential stopping places that are currently feasible stopping places for a vehicle within a region. The potential stopping places are identified as part of static map data for the region. Current signals are received from sensors or one or more other sources current signals representing perceptions of actual conditions at one or more of the potential stopping places. The stored data is updated based on changes in the perceptions of actual conditions. The updated stored data is exposed to a process that selects a stopping place for the vehicle from among the currently feasible stopping places.

Implementations may include one or a combination of two or more of the following features. The potential stopping places are initialized as all of the potential stopping places identified as part of the static map data for the region. The potential stopping places are discretized as a finite number of points within the region corresponding to potential stopping places. A potential stopping place is defined as a shape containing one of the points, the shape corresponding to a footprint of the vehicle. An orientation is attributed to the shape, the orientation corresponding to a direction of traffic flow. The potential stopping places are initialized as potential stopping places expected to be feasible based on prior signals from sensors representing perceptions of actual conditions at one or more of the potential stopping places. The sensors include sensors located on the vehicle.

The sensors include sensors located other than on the vehicle. Information is included in the updated stored data about how recently the updating occurred, or the reason for the indication that a potential stopping place is feasible or not feasible. The current signals received from sensors are received through V2V or V2I communication. The one or more other sources include crowd-sourced data sources. The vehicle is part of a fleet of vehicles managed from a central server and the method includes the server distributing information received from sensors at one of the vehicles to other vehicles of the fleet.

In general, in an aspect, a vehicle is caused to drive autonomously through a road network toward a defined goal position, and, if no potential stopping place that is in the vicinity of the goal position and is acceptable and feasible can be identified, a human operator not onboard the vehicle is enabled to drive the vehicle to a stopping place.

Implementations may include one or a combination of two or more of the following features. information is provided for presenting to the human operator a view associated with a state of the vehicle. The human operator is enabled to provide inputs to the steering, throttle, brake, or other actuators of the vehicle. The human operator is enabled to directly control a trajectory planning process for the vehicle by manually selecting a goal position for the vehicle or influencing the planned trajectory to the goal position. A passenger in the vehicle is informed or consent by a passenger in the vehicle is requested for the human operator to drive the vehicle to the stopping place.

In general, in an aspect, a vehicle is caused to drive autonomously through a road network toward a defined goal position at which a stopped activity is to occur. A set of acceptable stopping places is identified in the vicinity of the goal position. The identifying of the set includes: identifying a proximity region in the vicinity of the goal position, identifying a goal region within the proximity region, discretizing the goal region to identify acceptable stopping places given characteristics of the vehicle and of the stopped activity analyzing current information about potential stopping places in the goal region in the vicinity of the goal position to make a choice of a currently selected stopping place that is acceptable and feasible. Current information is analyzed about the potential stopping places, to make a choice of a currently selected stopping place that is acceptable and feasible the vehicle is caused to drive autonomously toward the currently selected stopping place. The activities are repeated until the vehicle stops at a currently selected stopping place.

Implementations may include one or a combination of two or more of the following features. The analyzing of current information includes analyzing a combination of static information that is known prior to the vehicle beginning to drive autonomously through the road network and information that is obtained during the autonomous driving. The analyzing of current information about potential stopping places includes continuously analyzing information from sensors on the vehicle or information from one or more other sources or both. If the vehicle has not stopped at a currently selected stopping place that is acceptable and feasible within a specified amount of time and within specified thresholds for acceptability and feasibility, activities are repeated using a relaxed threshold for acceptability, a relaxed threshold for feasibility, or both. The analyzing of current information includes analyzing map data about the road network. The analyzing of current information includes analyzing information about features in the vicinity of the goal position as perceived by sensors. The analyzing of current information includes analyzing distance of respective stopping places from the goal position. The analyzing of current information includes analyzing information about respective positions of the vehicle at the potential stopping places. The analyzing of current information includes analyzing information about whether the vehicle can legally stop at the potential stopping places. The analyzing of current information includes analyzing relative desirability of potential stopping places. The analyzing of current information includes identifying a set of potential stopping places that are within a proximity region in the vicinity of the goal position. The analyzing of current information includes removing potential stopping places from the set that are not feasible stopping places for the vehicle.

These and other aspects, features, implementations, and advantages, and combinations of them, can be expressed as methods, systems, components, apparatus, program products, methods of doing business, means and steps for performing functions, and in other ways.

Other aspects, features, implementations, and advantages will become apparent from the following description and from the claims.

DESCRIPTION

Figure 2:
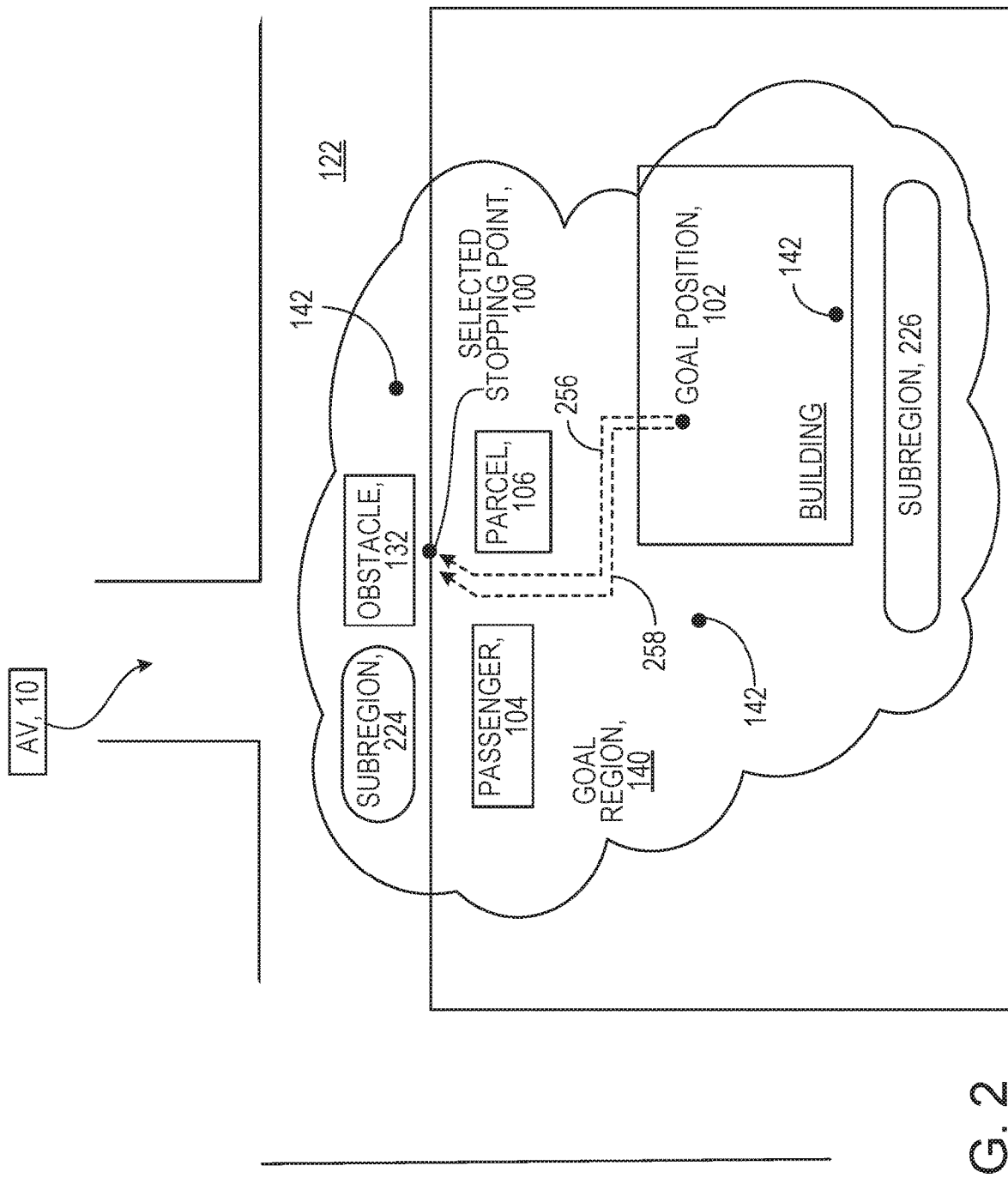
Figure 3:
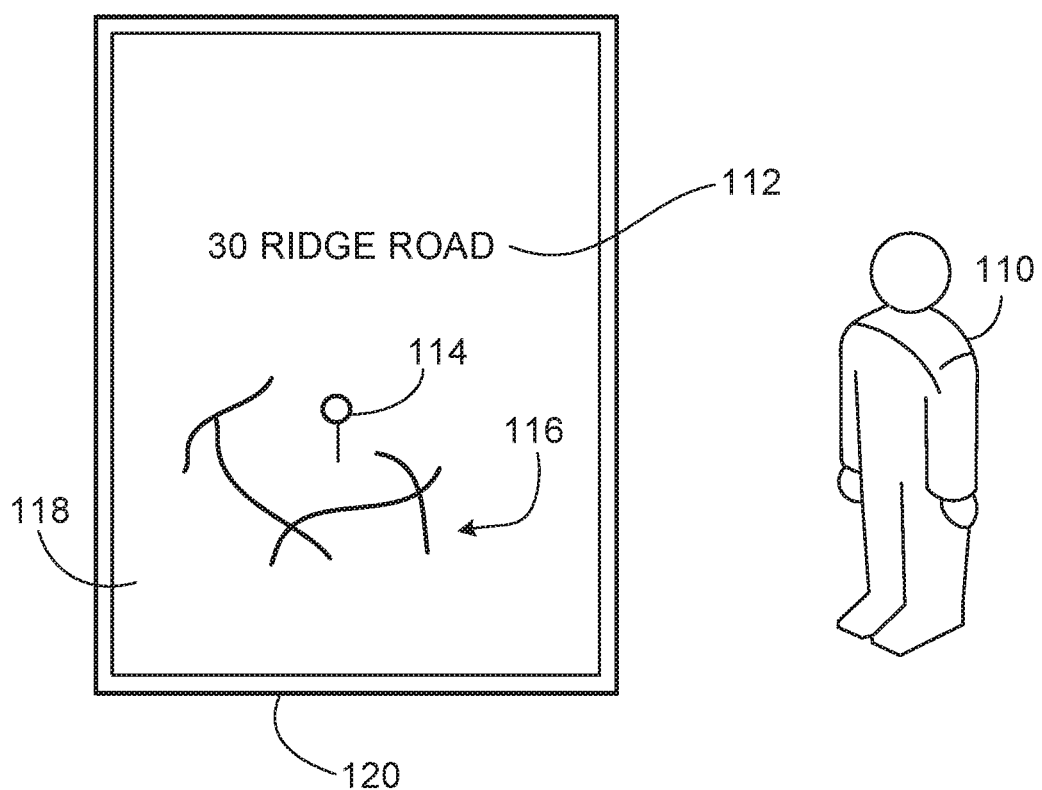
Figure 4:
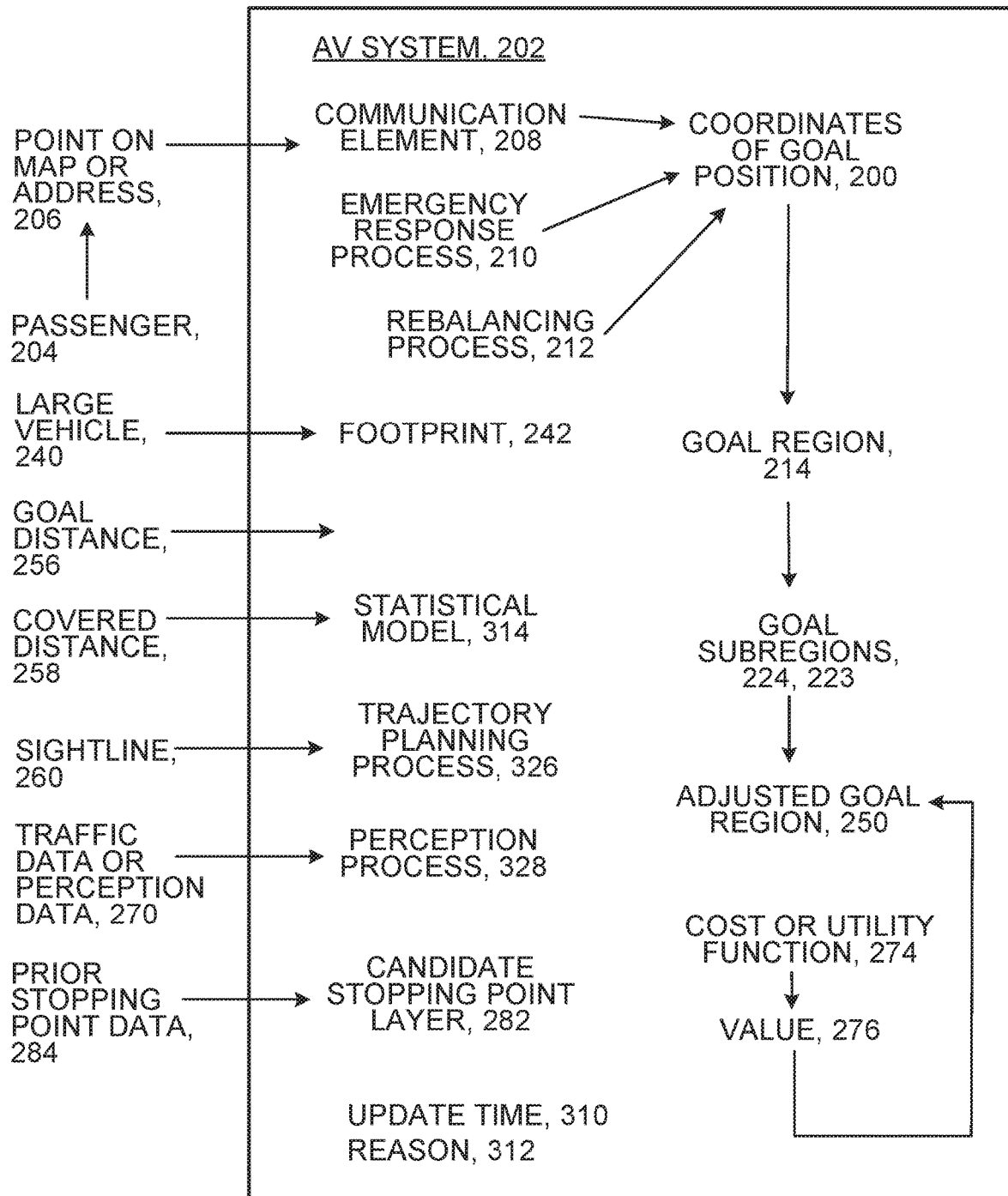
Figure 11:
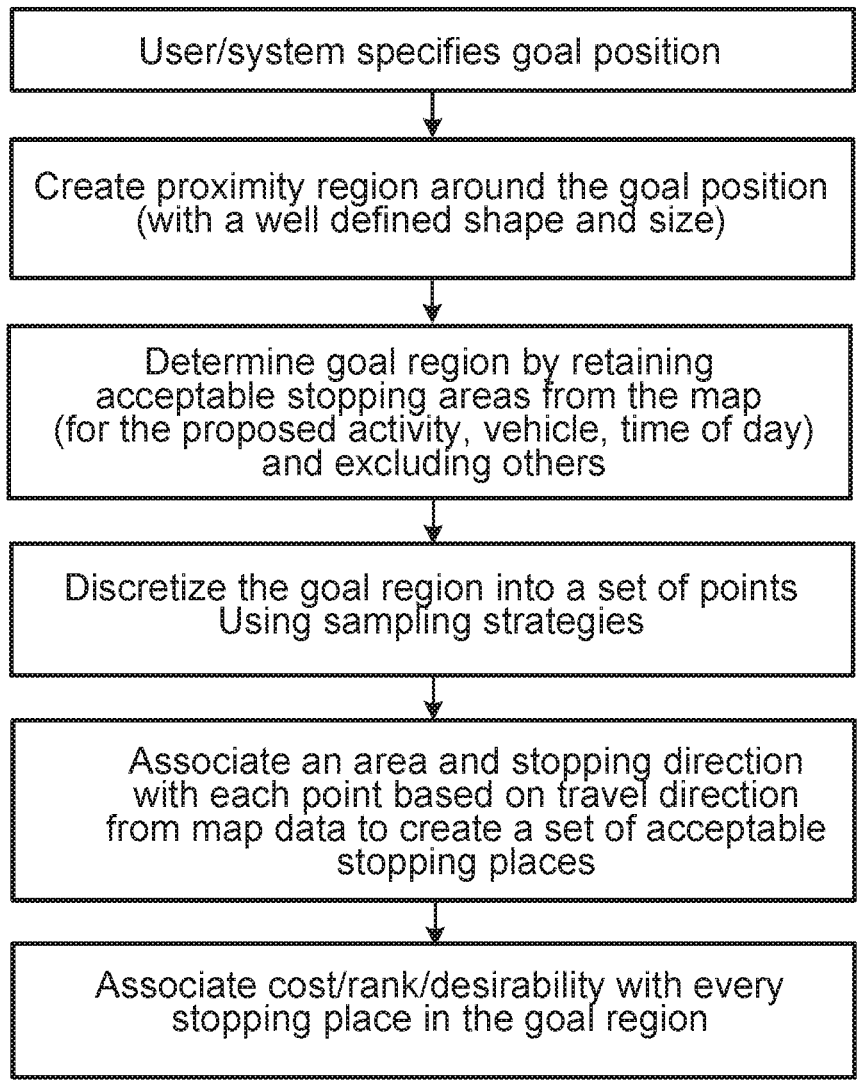
Figure 12:
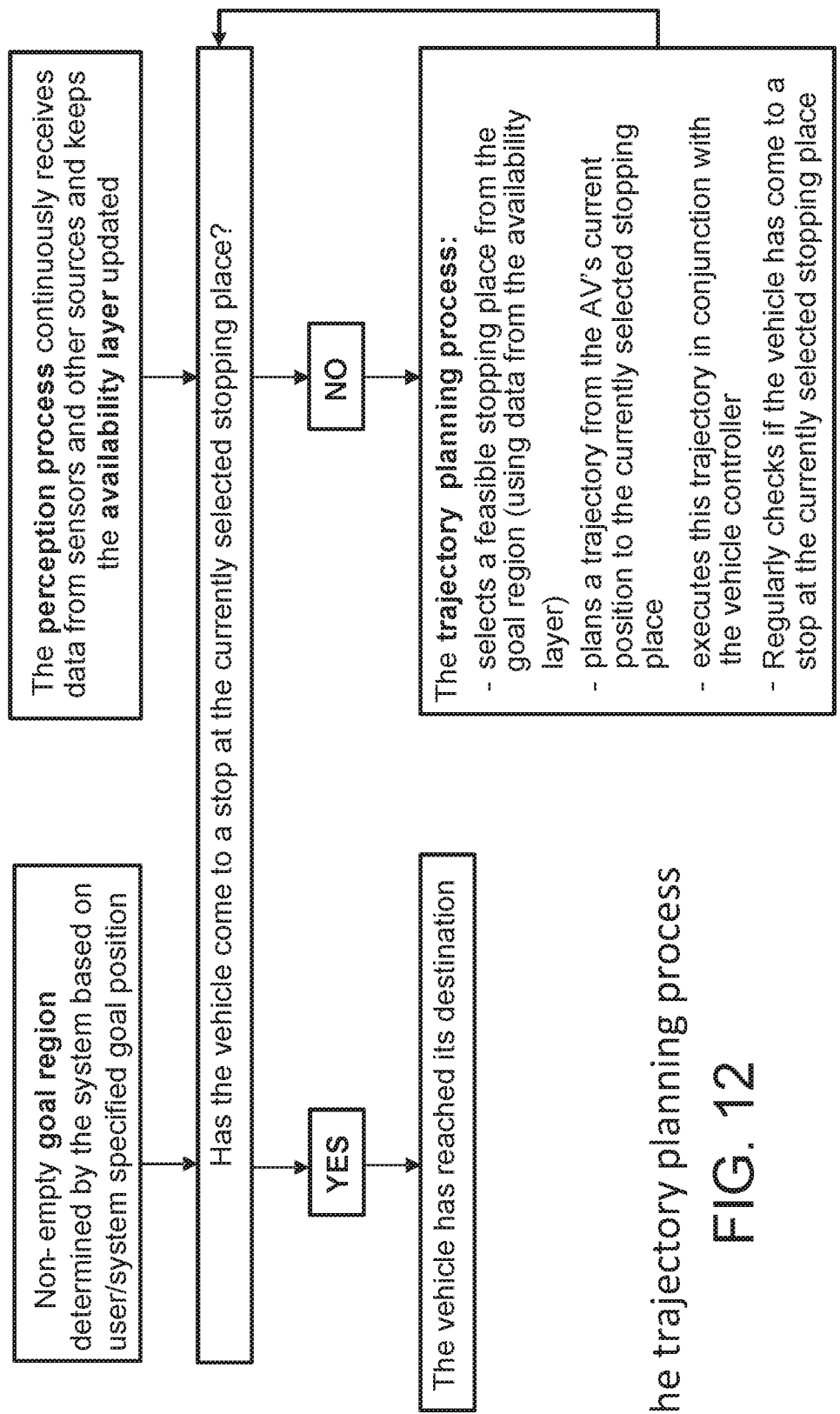
Figure 13:
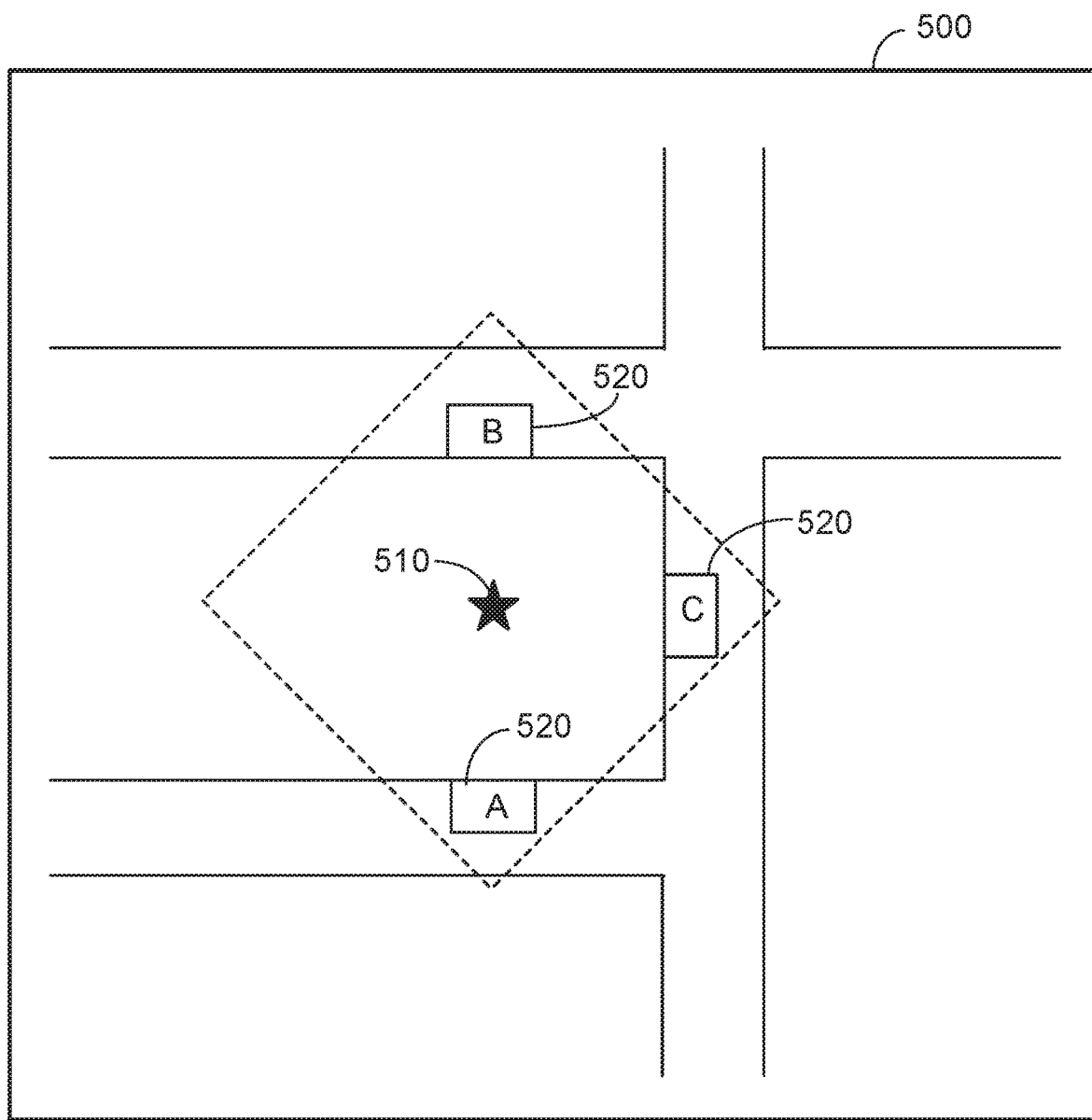

FIG. 1 is a block diagram.
FIGS. 2, 10, and 13 are schematic views of maps.
FIG. 3 is a screenshot.
FIG. 4 is a schematic diagram.
FIGS. 5 through 9 are schematic views of maps.
FIGS. 11, 12, 14, and 15 are flow diagrams.

The use of the following terms in this description are intended broadly and meant to include, for example, what is recited after each of the terms.

Annotated map data—conventional road network map data used, for example, for autonomous driving systems that has been augmented with data associated with potential stopping places. Conventional road network map data can include some or all of the data mentioned in item 5. under the Background heading above.

Autonomous vehicle (AV)—a vehicle that has autonomous driving capability.

Autonomous driving capability—an ability to safely and reliably drive through a road environment to a goal position while avoiding vehicles, pedestrians, cyclists, and other obstacles and obeying the rules of the road.

Coordinates—geographic longitude and latitude.

Acceptable—satisfies one or more criteria for evaluating the appropriateness of a stopping place as a place where, for example, the pick up or drop-off or other stopped activity can be done safely or legally or conveniently or expeditiously, among other criteria.

Stop—come to a halt for a limited period of time with the intention of completing a stopped activity.

Stopped activity—an action that may occur at a stopping place (other than, for example, a stop made in the course of driving such as at a stop sign or a traffic light), such as picking up or dropping off a passenger or parcel, or other action.

AV system—a set of elements or components or processes located on an autonomous vehicle or at other locations, or a combination of them, and that together do the things that must be done in order to enable an autonomous vehicle to operate.

Passenger—a human being who is to be picked up or dropped off at a stopping place by an autonomous vehicle and (for convenience and simplicity in the prose) a human being who wants to have a parcel picked up or dropped off by an autonomous vehicle.

Stopping place—an area that the vehicle occupies (identified by a defined shape, typically a rectangle, at a defined location in the world) and a direction in which a vehicle is facing when stopped at the stopping place.

Acceptable stopping place—a stopping place that is acceptable because it is safe, legal, and convenient for the passenger.

Potential stopping place—a stopping place that is under consideration by an AV system.

Feasible stopping place—a stopping place that is possible for the AV to reach and stop at.

Currently selected stopping place—a stopping place that is currently selected by an AV system.

Actual stopping place—a stopping place where an AV actually stops.

Availability layer—a layer of annotated road data that identifies potential stopping places included in the road data.

Goal position—a position that is an intended destination, is identified by coordinates on a road network, and has been specified by a passenger or an element of an AV system.

Proximity region—a region defined around or in the vicinity of the goal position and entirely within a fixed configurable distance of a point within the region (e.g., its center). The proximity region need not be round because the distance metric employed in calculation of the region may be defined in a non-Euclidean metric space.

Goal region—a region defined around or in the vicinity of the goal position such that any stopping place within the goal region is an acceptable stopping place for the AV.

Sub-region—a portion of a region.

As shown in FIG. 2, we describe techniques by which an AV system can determine and continuously update a currently selected stopping place 100 for an AV at or in the vicinity of a goal position 102 to which the AV is driving. At the currently selected stopping place, the AV will stop and engage in or enable a stopped activity, including, for example, picking up or dropping off a passenger 104 or a package 106 or both. We use the term "stop" broadly to include, for example, stop, park, or stand.

At least the following complexities must be taken into account in determining and updating a selected stopping place:

1. The AV's goal position is often specified directly as geographic coordinates (latitude and longitude) or indirectly by an address or some other form of identifier that can be translated into geographic coordinates. Sometimes the goal position is specified by a passenger who wants to be picked up or dropped off by the AV roughly at that position, or by a user who wants to load a parcel onto the AV at that position for delivery to another location, or unload a parcel. For simplicity we use the word passenger to refer not only to a human rider but also to a user who is to load or unload a parcel even though that user may not be a rider in the AV.

As shown in FIG. 3, a passenger 110 can specify a goal position by typing out an address 112 or by dropping a pin 114 on a map 116 using a touch-based user interface 118 of a mobile app running on a user device 120. In some cases, the coordinates that are entered directly or that result from translation of such an address or other identifier may correspond to a goal position that does not lie on a drivable road 122 or other drivable feature of the road network, such as a goal position within a building, waterway, park, or other non-drivable feature.

2. Even when the specified goal position is on a road or other drivable feature, the coordinates may correspond to a location on the road that is not an acceptable stopping place (e.g., because it is not a safe or legal stopping place), such as a stopping place in the middle of the road or at the side of a busy highway. We use the term "acceptable" broadly to refer to satisfying one or more criteria for evaluating the appropriateness of a stopping place as a place where, for example, the pick up or drop-off or other stopped activity can be done safely or legally or conveniently or expeditiously, among other criteria.

3. The coordinates of the goal position may correspond to an acceptable stopping place 130 on a road or other drivable feature where, for example, it is normally safe and legal for the AV to stop (e.g., a taxi stand or a reserved parking space). Yet for a variety of reasons such as the temporary presence of a parked vehicle or other obstacle or construction works 132, it may be temporarily impossible for the AV to stop there. In other words, such an acceptable stopping place is not a feasible stopping place.

4. The coordinates of the goal position may correspond to an acceptable stopping place where a road or driveway exists, but the AV may not have map information sufficient to enable it to determine that the goal position represents such an acceptable stopping place. This circumstance may occur on private roads or grounds, such as private residences, shopping malls, corporate campuses, or other private sites. In other words, such an acceptable stopping place is not a feasible stopping place.

5. The coordinates of the goal position may correspond to an acceptable stopping place that would require passing through a feature that the AV cannot navigate. For example, the acceptable stopping place may lie beyond the entrance of a parking structure that requires human interaction (e.g., to retrieve a parking ticket), beyond a guard post or checkpoint, or beyond a road region that the AV has otherwise identified as impassable (e.g., due to the presence of road construction). In such circumstances, the otherwise acceptable stopping place is not a feasible stopping place.

In all of these cases and others, the AV needs to find a stopping place on the road that is not only acceptable but is also a feasible stopping place.

Although we have been discussing considerations in selecting an acceptable and feasible stopping place that is in the vicinity of a goal position that has been specified by a passenger, circumstances may sometimes require that the AV stop in the vicinity of a goal position that is not a passenger-specified goal position. For example, in the event of a passenger medical emergency, the AV may be automatically re-directed to the closest medical center. Another example is that of a centrally coordinated service, where a central optimization algorithm asks an idle AV to reposition itself (for example, in expectation of higher passenger or freight demand around the new location). The techniques that we describe here are applicable to such other goal positions as well. Thus, we use the term "goal position" broadly to include, for example, any position on the road network to which the AV is driving for the purpose of stopping.

Although we often refer to a goal position as a single specific location defined by geographic coordinates, a goal region 140 of a configurable size and geometry can be defined around or in the vicinity of the goal position coordinates. A goal region is the region within which it would be acceptable for the AV to stop to engage in stopped activities, for a goal position located at the specified coordinates. If the AV were to stop at any stopping place within the goal region, it would be considered to have stopped acceptably near to the goal position, that is, at an acceptable stopping place.

All potential stopping places that are acceptable (and therefore within the goal region) and feasible may not be equally desirable. For example, some of those feasible stopping places may be closer to the goal position than others, making them more desirable.

Given an AV that has an autonomous driving capability, the techniques and systems that we describe here enable the AV to select and then drive to a selected stopping place within the goal region that is acceptable, feasible, and desirable.

Data from road map data sources that was mentioned earlier is typically used for the purpose of AV routing and autonomous navigation. We assume, to the extent necessary for the techniques and systems mentioned here to function, that the data is augmented (if necessary) to include the following annotated map data:

1. Data about areas that contain potential stopping places where it is legal for the AV to stop including the direction in which it is legal for the AV to stop there, restrictions on how long the AV can stop there, restrictions on what type of vehicles can stop there, restrictions on what activities stopped vehicles can engage in (e.g., loading zones) and any other relevant information. For example, on busy roads it might only be legal to stop at the very edge of the road, adjacent to the curb. However, on a quiet residential street, it might be acceptable to double park and stop in the travel lane itself. On certain roads, stopping might be completely disallowed (except during emergencies). On certain roads, it may not be legal to park during snow emergencies.

2. Data about areas that include potential stopping places where AVs might not normally drive, but nevertheless are allowed to stop (e.g., parking lots, driveways) and restrictions associated with those areas. These areas are specifically identified in the data to ensure that the AV system does not use these areas for any purpose other than stopping.

3. Data about areas that contain potential stopping places where it is not legal for a vehicle to stop in any situation (e.g., no stopping zones, in front of certain buildings such as fire stations, etc.) and any exceptions to those rules (e.g., a loading zone might permit cargo drop-offs but not passenger drop-offs.)

The process of gathering the annotated map data normally happens offline before the data is in active use by the AV or may be streamed to the vehicle wirelessly as it travels. Also, some of this data may be gathered in real-time using data from the AV's perception system.

Given an AV that has access to the annotated map data and has an autonomous driving capability, the process shown in FIG. 4 illustrates an example of how a selected stopping place may be determined. A wide variety of other sequences and components of the process could be used.

1. As shown in FIG. 4, the geographic coordinates of the goal position 200 of an AV are specified directly or inferred by the AV system 202 in one or more of the following ways and in other ways or combinations of them:

a. A passenger indicates a point on a map or an address 206 as the goal position of the AV. This could be done on a mobile app, a kiosk, a notebook, a tablet, or a workstation 207, to name a few examples. The map or address is communicated wirelessly to and received by a communication element 208 of the AV system 202.

b. The AV system itself sets a goal position based on one or more processes, for example, an emergency response process 210 that routes a vehicle to the nearest hospital or a vehicle re-balancing process 212 that routes the vehicle to a different goal position in a city, etc.

2. As shown in FIG. 4, given the coordinates of a goal position, a goal region 214 is defined by the AV system 202. The goal region contains potential stopping places (based on available annotated map data) where it is acceptable for the AV to stop to perform a stopped activity. As noted before, not all of these potential stopping places may be feasible or equally desirable. Also, the goal region may be updated for a variety of reasons, for example, as more information becomes available.

Figure 5:
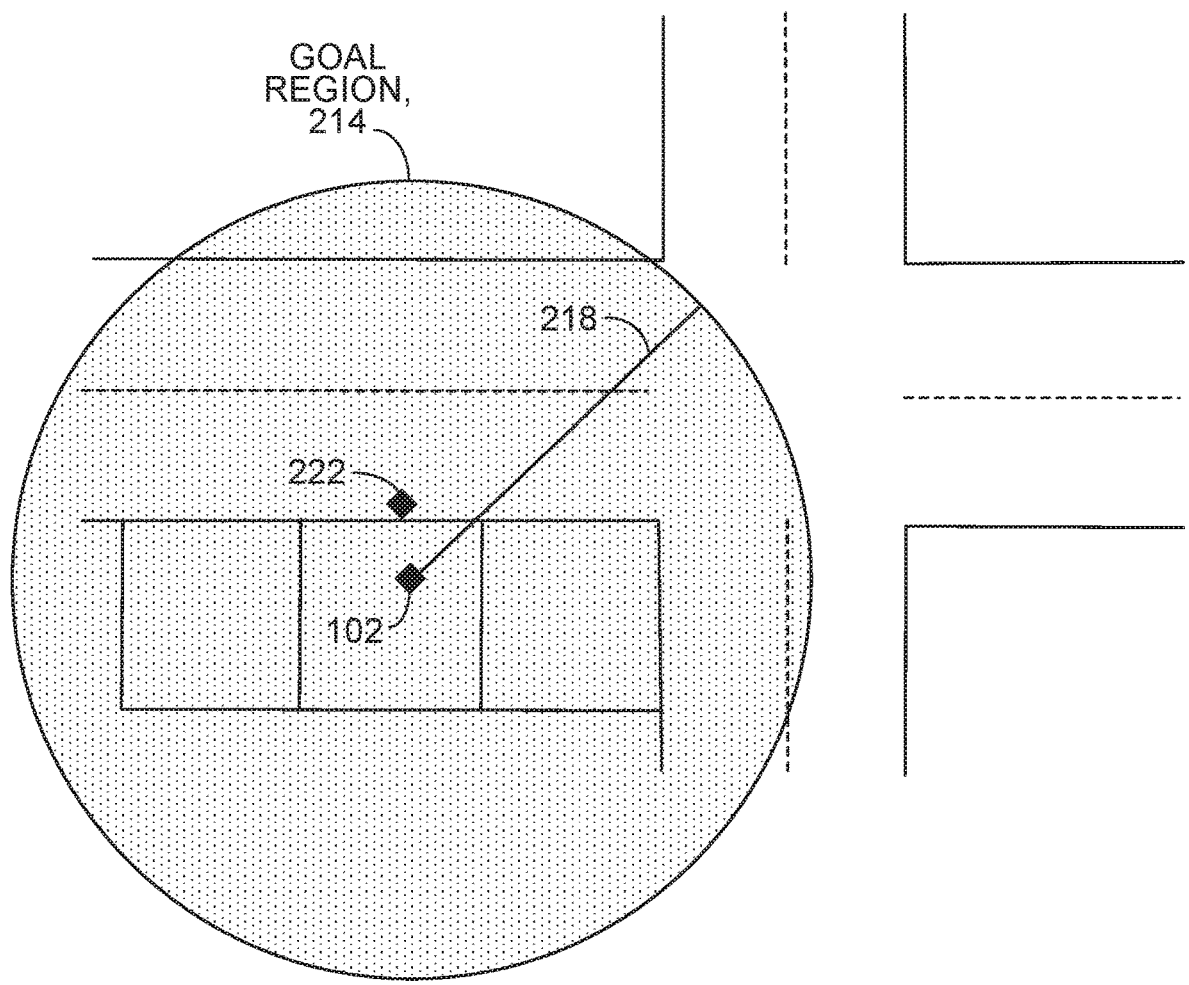

As shown in FIG. 5, to define the goal region, the AV system first creates and stores a proximity region 214. The proximity region comprises both acceptable and unacceptable stopping places. The goal region is defined as the subset of the proximity region where all stopping places are acceptable. However, not all of these acceptable stopping places in the goal region are feasible or equally desirable. So finally, a stopping place is selected from the goal region that is both feasible and desirable, and the AV navigates to the currently selected stopping place.

The proximity region is defined to be within, for example, a fixed, configurable distance 218 from the goal position. The center of this proximity region could be the goal position itself, or a point 222 on the drivable area of the map that is near (e.g., "nearest") to the goal position, or something similar.

This fixed configurable distance could be calculated by the AV system in a number of ways, including but not restricted to one or a combination of:

1. Straight line distance (i.e., all points within a specific radius from the center).

2. Manhattan or grid distance.

3. Walking distance (i.e., all points within a specific walking distance from the center).

4. Points that are within line of sight of the goal position (based on appropriate sightline data).

5. Other non-Euclidean distance measures

This allows the proximity region to take a variety of shapes beyond that of a circle. We note that the actual shape of the proximity region is not important, as long as it is well-defined.

The goal region is then determined by excluding from the proximity region sub-regions where stopping is not allowed, and retaining the sub-regions where stopping is allowed, given the nature of the stopped activity, expected duration of stopping, nature of the AV, time of the day, etc. This can be done, for example, by determining the intersection of the areas in the annotated map data where stopping is allowed (given the nature of the stopped activity, expected duration of stopping, nature of the AV, time of the day, etc.) with the proximity region. Such geospatial intersections may be performed using available commercial or open-source software, for example ArcGIS, MongoDB.

Examples of such sub-regions include one or more of the following:

a. Certain areas such as loading zones might be used for cargo (we sometimes use the word cargo interchangeably with parcel) pickups and drop-offs, but not for passengers. Similarly, certain driveways might be usable for passengers but not for cargo. Such restrictions could be part of the annotated map data. Therefore, depending on the purpose of the stopped activity (which could be provided by the passenger or the AV system or another source), certain sub-regions can be excluded from the proximity region.

b. Some sub-regions might be excluded because the allowed stopping time in the stopping places in that sub-region is not sufficient to carry out the stopped activity. The estimated duration of the stopped activity can be influenced by a number of factors including one or more of the following. A pickup is generally slower than a drop-off as the passenger might need first to locate the AV and confirm his identity to the AV. Cargo stops might be slower than for passengers because of time needed to load or unload. Multiple passengers getting in or out of the AV might be slower than a single passenger. Certain sub-regions of the goal region might have restrictions (captured in the annotated map data) on how long a vehicle can stop there and therefore might not be suitable for some stopped activities. Independent configurable time parameters can be defined that relate to the expected time required for a pickup, drop-off, loading of cargo, unloading of cargo, and loading and unloading of one or multiple passengers or for other stopped activities. Certain sub-regions can then be excluded from the proximity region if the allowed stopping time in that sub-region is less than the expected stopping time of the stopping activity.

c. Some vehicle types (e.g., trucks or buses) might not be allowed to stop in certain zones. The vehicle type is known to the AV system. Certain sub-regions can then be removed from the proximity region if they correspond to zones where the AV is not allowed to stop.

d. Some large vehicles 240 (e.g., trucks or buses) might not physically fit into a certain zone, depending on the shape and size of the vehicle relative to that of the zone. To ascertain this, an AV footprint area (normally a rectangle) 242 is defined by the AV system corresponding to the footprint of the AV with a margin added in each dimension to account for overhangs and errors and provide a safety margin. Any sub-region of the proximity region that is unable to fully contain this AV footprint area is then excluded from the proximity region.

e. Even though some part of the proximity region, say a parking space at a particular stopping place, is able to accommodate the AV configuration area, the driving approaches to reach that space may be too small for the AV footprint area. In other words, the stopping place is not a feasible stopping place because no feasible path exists for the AV to reach that stopping place. This situation is accommodated as part of the trajectory planning process described later.

A proximity region in the vicinity of the road network can be annotated to exclude sub-regions that relate to the particular stopped activity, the AV, or the time of day.

Figure 6:
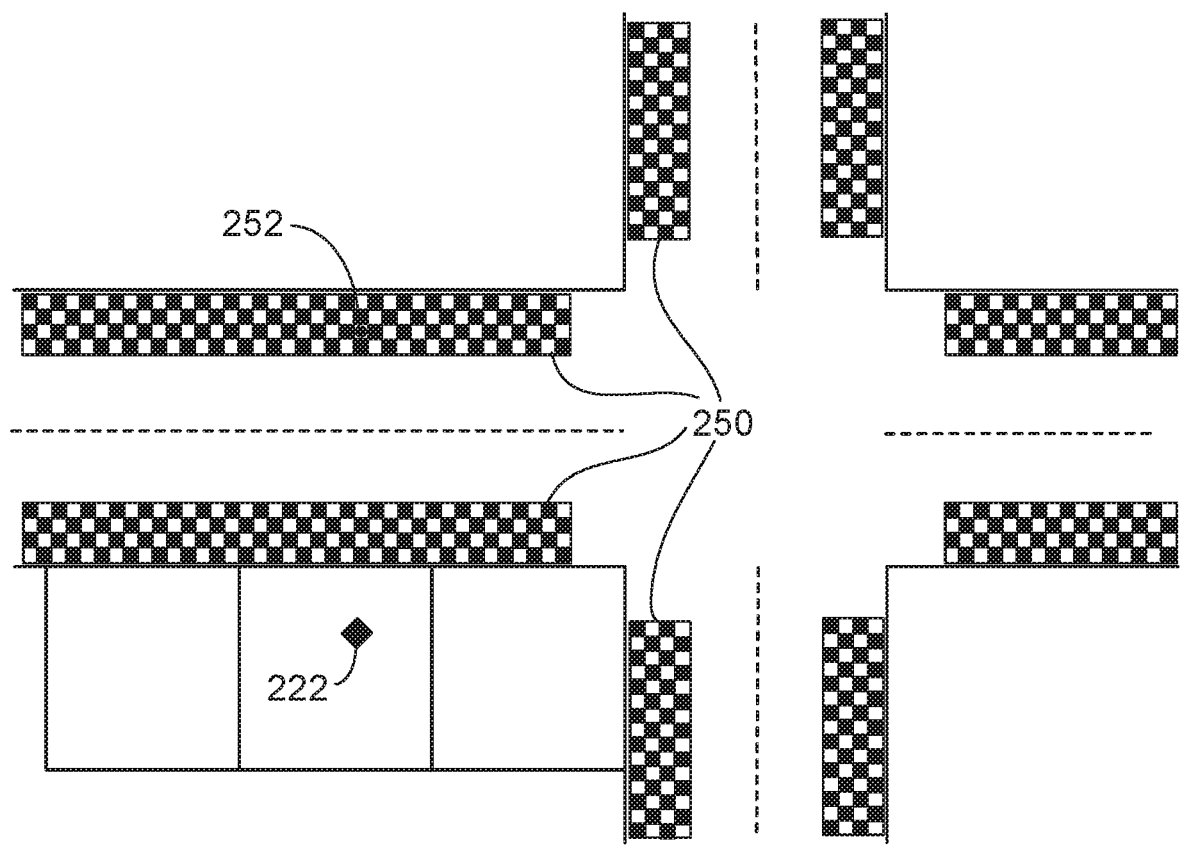

An example of a goal region 250 is shown in a checkerboard pattern in FIG. 6. The exclusion of sub-regions from the proximity region yields the goal region 250.

Although the goal region or the proximity region can be defined as a mathematical set having potentially an infinite number of potential stopping places 252, in some implementations this can be discretized into a set having a finite number of potential stopping places using a number of well-known discretization strategies (e.g., random sampling, uniform sampling). These sampling strategies would yield a finite number of points within the proximity region. A stopping place could be constructed around each of these sampled points, for example, by drawing a rectangle corresponding to the AV's footprint around the sampled point. The sampled point could be the centroid of the rectangle. The size of the rectangle would have to be sufficient to accommodate the footprint of the AV including space for overhangs or a safety buffer on all sides. The orientation of the rectangle would be determined by the direction of the traffic flow at that point. For example, if the sampled point is on a traffic lane, the vehicle would have to stop in the direction of the traffic flow. The rectangle would be oriented accordingly and would be characterized both by its size, boundaries and its orientation. If the rectangle thus specified falls entirely within the proximity region, the stopping place that it represents would be considered to be a part of the proximity region.

As mentioned above, each potential stopping place in the goal region is associated with a direction in which it is legal for the leading end of the AV to point when stopped. This direction is inferred from the annotated map data which specifies legal driving directions for all parts of the roads and other drivable features, including traffic lanes.

Figure 7:
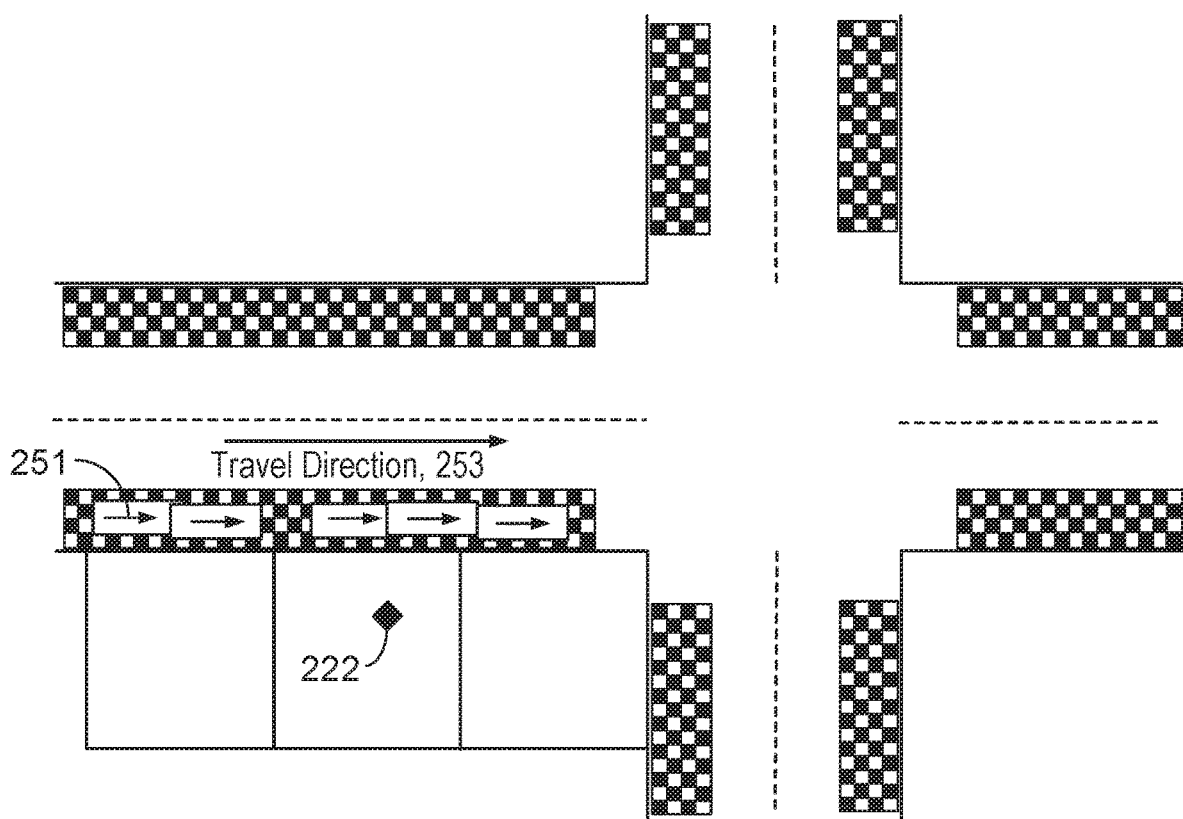

FIG. 7 illustrates a few sample stopping places 251 (rectangles with arrows pointing in the direction that the leading end of the AV must face). The direction of a stopping place is inferred from the direction of travel 253 in the lanes which are shown with dashed arrows. A goal region might have an infinite number of valid stopping places and the stopping places shown in FIG. 7 are merely a sample.

As noted before, all stopping places within the goal region are considered acceptable stopping places, though they may not all be feasible stopping places or equally desirable.

If the goal region has no acceptable stopping places, i.e., it is empty, then the system may expand the size of the proximity region and re-calculate the goal region. This expansion may be done automatically by the AV system, or by presenting the option to the passenger through the user interface, or by a combination of both.

Figure 9:
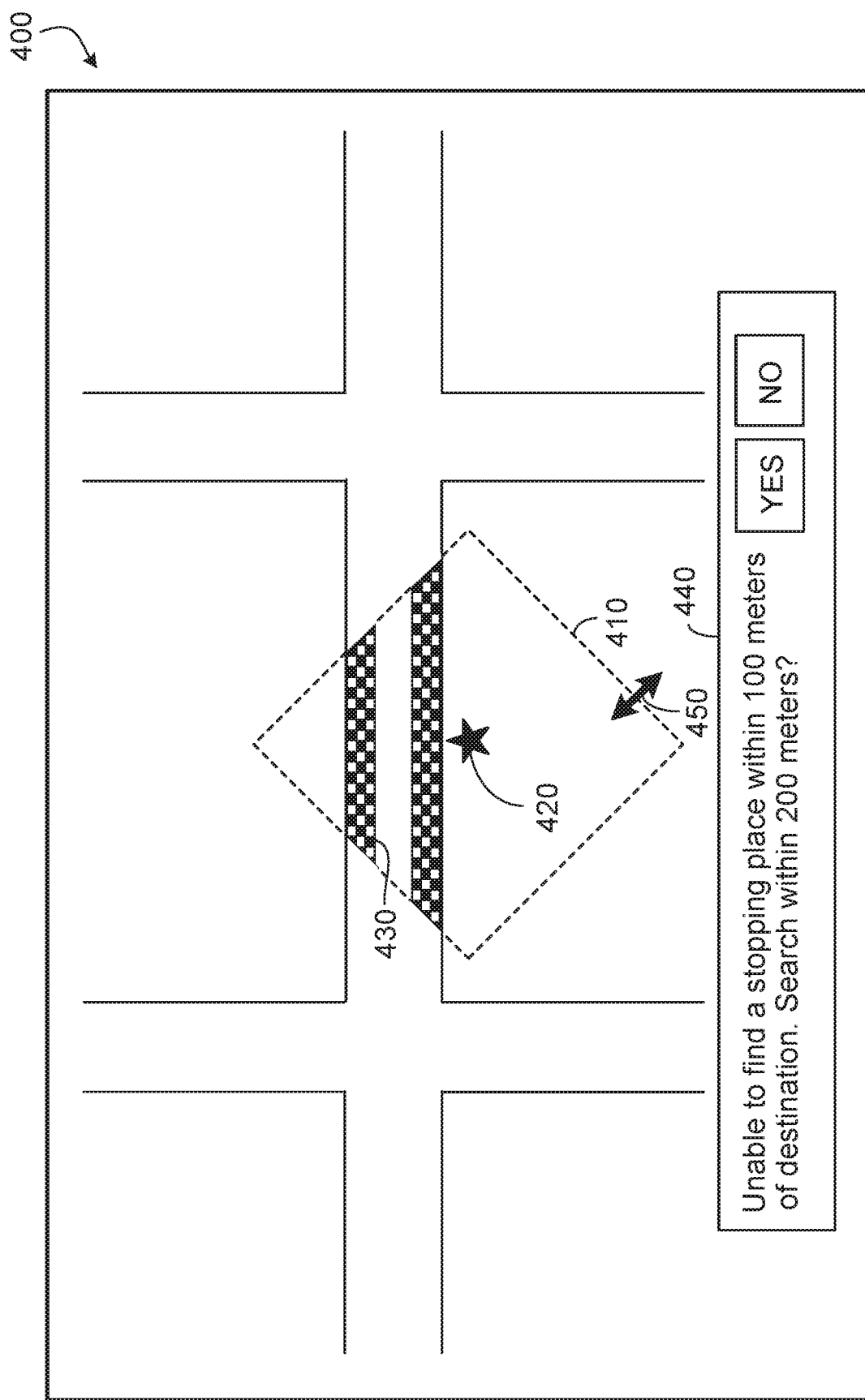
Figure 10:
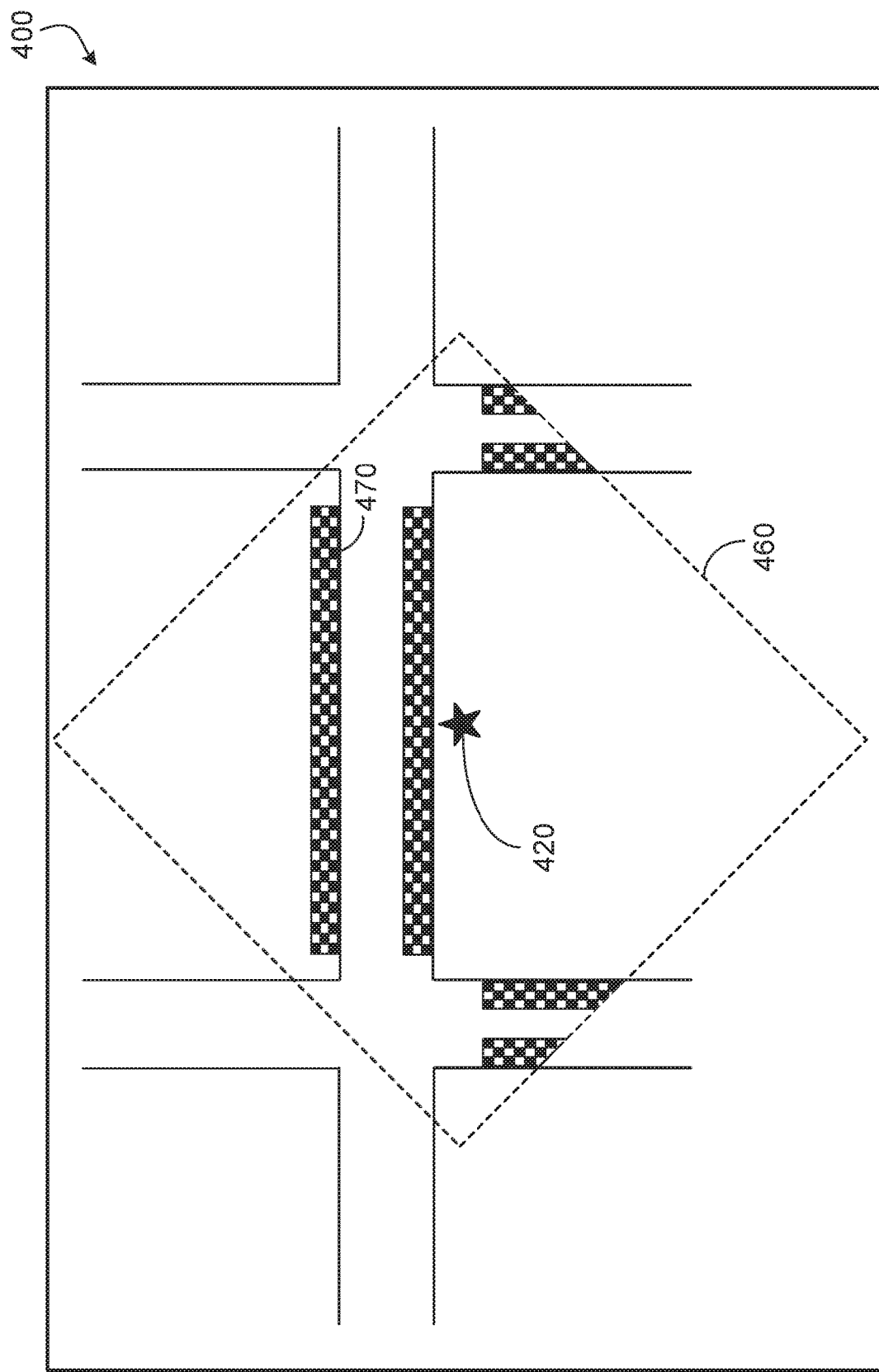

As shown in FIGS. 9 and 10, in an example of a user interface 400 for presenting options of the passenger, if the initial proximity region 410 comprised stopping places that are within a certain distance, say 100 meters, of the goal position 420, the goal region 430 may be empty (i.e. it contains no acceptable stopping places). The passenger could be prompted (through a smartphone app that was used for booking the ride, or through a touch-screen inside the car in the case of a stop in which the stopping activity is to drop a passenger, for example) and asked if, for example, double the walking distance associated with the initial proximity region would be acceptable to the passenger, as shown in the user prompt 440. In some cases, the user interface could allow the passenger to specify the maximum walking distance that is acceptable to the passenger. In some instances, the user interface could allow the passenger to specify the proximity region more directly, for instance by allowing the passenger to draw the region or by providing a mechanism for the passenger to relocate the boundaries of the region, for example using a boundary expansion tool 450 (which is an example of a touch-based drag and drop tool). The expanded proximity region 460 and the expanded goal region 470 may also be shown to the passenger.

Figure 15:
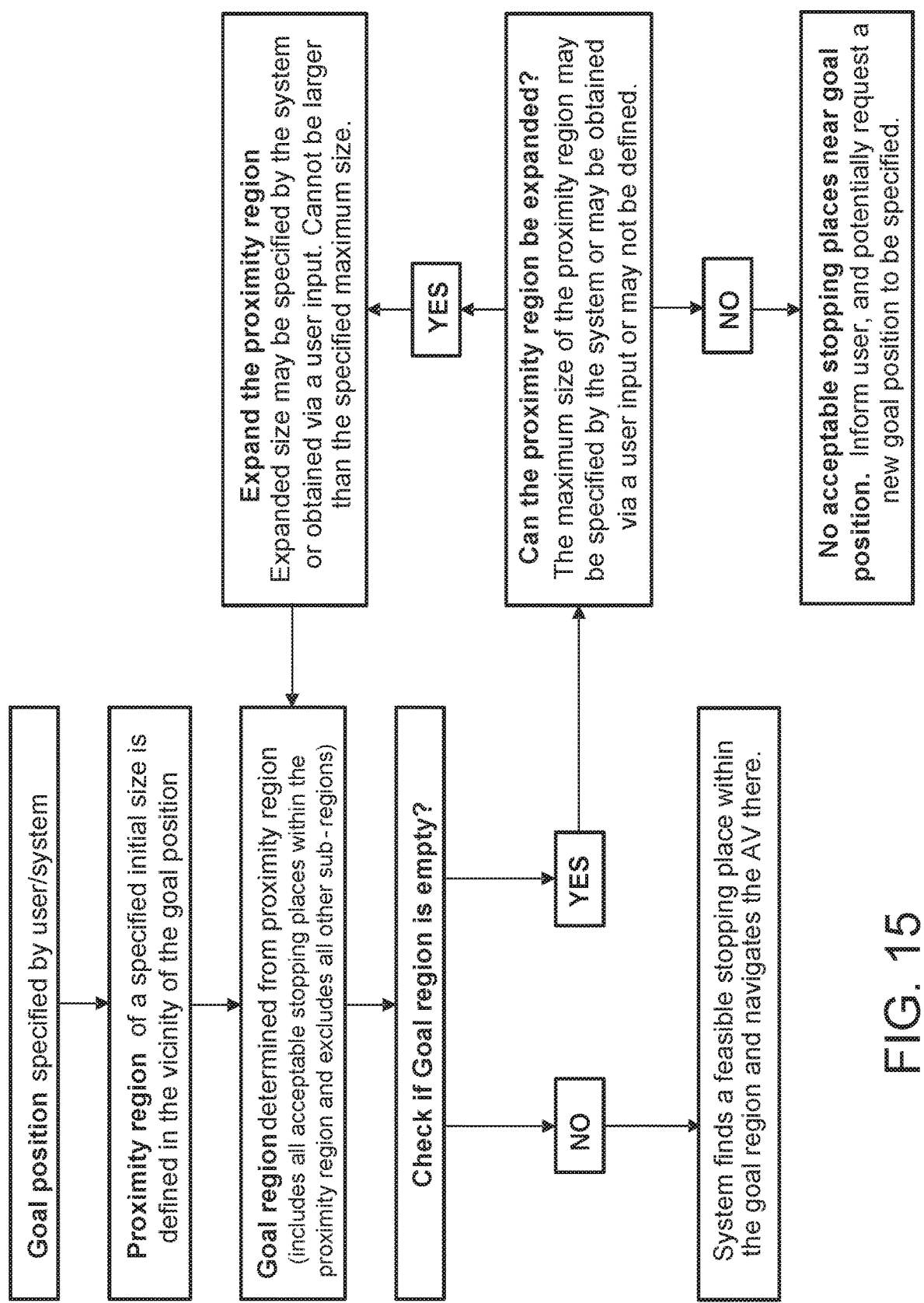

The expansion may be subject to some upper limit on the size of the proximity region. It is possible that despite expansion up to the upper limit, the goal region may still be empty. This could happen, for example, if the goal position is in the middle of a large field or a military installation. In these cases, the passenger will be informed through the user interface that no acceptable stopping places may be found in the vicinity of the goal position, and the passenger may be requested to select a different goal position. FIG. 15 shows a flowchart of the activities involved in an example of the process used if the goal region is empty.

Not all stopping places are equally desirable for stopping. The desirability of a stopping place depends on, for example, quantifiable factors such as, but not limited to, the following:

1. Walking distance to the goal position from the stopping place. This distance 256 (FIG. 4) is computed by the AV system using one or a combination of distance metrics, such as the Euclidean distance, Manhattan distance, or another metric, or using exact information about walking paths obtained from the map data. Generally, a stopping place that has a shorter walking distance is more desirable.

2. Covered walking distance to a goal position from the stopping place (i.e., walking distance with protection from the weather). Again, this covered distance 258 can be computed using one or a combination of distance metrics, such as the Euclidean distance, Manhattan distance, or another metric. Generally, a stopping place that has a shorter covered distance is more desirable. In some scenarios a covered walking path or data about the coverage of walking paths might not exist.

3. Clear sightline to the goal position, because it is generally desirable for a passenger at the goal position to be able to see a stopped AV based on its stopping place. The presence of a clear sightline 260 from the stopping place under consideration to a passenger at the goal position can be inferred given a 3D model of the local environment that includes the dimensions and locations of buildings and other objects, such as is available from sources such as Google Earth.

4. Distance from the curb. Stopping place that are closer to curbs are generally preferred as they allow the passenger to access the AV more easily. Information about curbs may be part of the annotated map data or may be perceived by sensors on the AV.

5. Type of road. Generally, it is desirable for the AV to stop on a road that has fewer lanes or has a lower speed limit or both. The lane configuration and speed limit information may be part of the annotated map data.

6. Expected or actual traffic. Generally, it is desirable for the AV to pick up or drop off a passenger or parcel on a road that is less trafficked as determined, for example, by AV system analysis of historical traffic data or data 270 collected by sensors mounted on the AV or both.

7. Designated stopping area. Generally, it is desirable for the AV to stop at a pre-defined stopping zone such as a taxi stand, a hotel pick-up and drop-off zone, a loading zone or other pre-defined stopping zone, compared to stopping in the travel lane of a road.

Given that the desirability of a stopping place depends on a variety of factors of different types, it is useful to combine them in a way that facilitates comparisons of the relative desirability of different stopping places. One or a combination of two or more of the following approaches can be used by the AV system in taking account of the factors:

1. The AV system creates a generalized cost or utility function 274 for stopping places that normalizes all factors (using calibrated weights or scaling factors) to create a single cost or utility value 276 associated with each stopping place. These costs or utilities, being numbers, can then be directly compared. The cost function can be continuous (e.g., the Euclidean distance from the stopping place to the goal position) or binary (e.g., a certain non-zero cost if a sightline between the stopping place and destination point does not exist, and a cost of zero if a sightline does exist). The cost can also depend on the type of stopped activity, e.g., whether it is a pickup or drop-off of a passenger, multiple passengers, or a parcel.

2. The AV system converts each factor to a 0-1 range and applies fuzzy logic rules to compare stopping places.

3. The AV system uses a prioritized comparison, in which factors that are defined to be more important are compared before factors that are less important. This kind of prioritized comparison can also impose minimum and maximum values on each factor to ensure that the selected stopping place meets the maximum and minimum requirements for each factor.

4. The AV system creates ranks such that a stopping place with a higher rank is more desirable than a stopping place with a lower rank. The goal region might be subdivided into sub-regions each with its own rank, and all stopping places within a sub-region could share the same rank, i.e., desirability.

As shown in FIG. 4, based on the previous activities the AV system can determine and store the goal region 250 containing a set of stopping places all within the goal region, where stopping is acceptable given the nature of the stopped activity and the AV. A desirability index or utility or cost or rank (i.e., a measure of desirability) can be associated with each stopping place in the goal region. FIG. 11 shows a flowchart of the activities involved in an example of the process of defining a goal region.

The AV system also maintains what we term an availability layer 282 that can be thought of as an overlay on the map's potential stopping places. This availability layer of the annotated map data identifies to the AV system, for each potential stopping place, whether the potential stopping place is a feasible stopping place.

If no prior information on the feasibility of stopping places is available, the availability layer can be initialized by assuming that all potential stopping places are feasible stopping places. Prior data about stopping places 284, if available, for example, from previous trips or from other vehicles or from sensor infrastructure, can be used to initialize the layer with stopping places expected to be feasible, while identifying those are not expected to be feasible.

The availability layer is continually updated in real time as, for example, the AV perceives new information from its sensors. This information can come, for example, from a variety of sensors such as LIDAR, Radar, ultrasonic, video camera, IR, etc., which allow the AV to determine the shape and position of objects in its environment.

For example, LIDAR data allows an AV to find other vehicles in its environment. The areas occupied by those vehicles (along with a buffer assumed to be around each of the vehicles to account for sensing error or vehicle overhangs) can then be removed from the availability layer as these areas are not available to the AV for stopping. Similarly, objects such as traffic cones or road signs (denoting construction work) can be detected using a combination of LIDAR and video cameras. Sometimes an object can be detected but cannot be classified, for example, a fallen tree or construction debris. In these cases, the AV system may note that the related area is not available and therefore remove it from the availability layer. In some cases, an object may be detected but does not represent an obstacle to stopping (for example, a moving pedestrian). In those cases, the corresponding stopping places can be retained in the availability layer.

Figure 8:
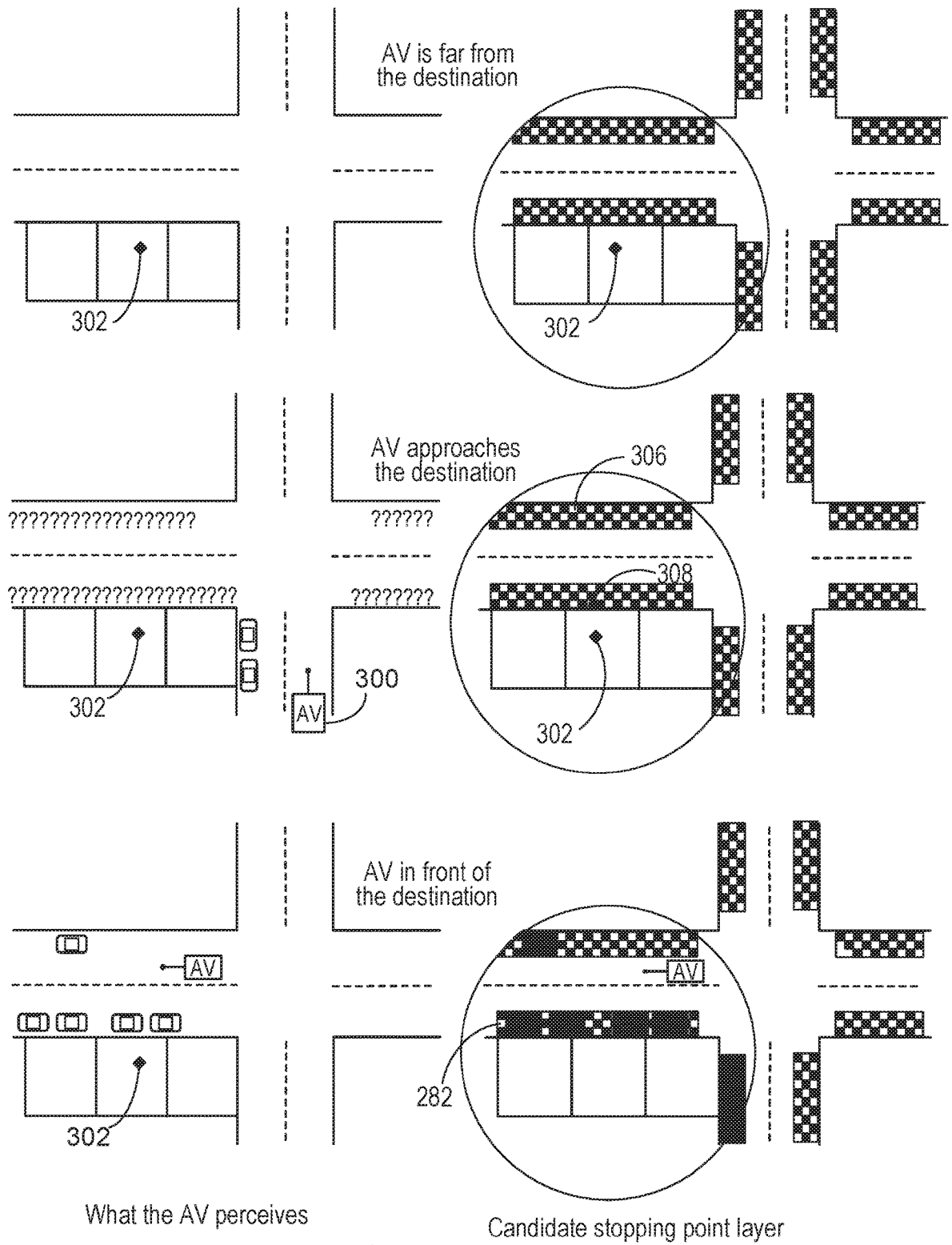

FIG. 8 shows an example of what an AV 300 that is approaching its goal position 302 perceives and how the availability layer 282 is updated as a result of that perception. The checkerboard pattern 306 denotes the part of the goal region that includes only stopping places that are feasible.

The availability layer is updated frequently, using both the AV's own perception data and external information. The frequent updating is important because the AV can stop only at a stopping place 308 that it is currently perceiving as being feasible. A stopping place that was assumed to be feasible (because of previous perception or information from another vehicle, etc.) might not actually be available (e.g., feasible) when the AV approaches that stopping place and sees for "itself". Similarly, a stopping place that was previously thought to be unavailable (and therefore infeasible) might actually be available (and therefore feasible) when the AV perceives it directly.

In addition to the last known feasibility status, the availability layer in the annotated map data could also store, for each potential stopping place:

1. The time of the most recent update of the stopping place status 310, as it is a measure of the current accuracy of the information. A stopping place that was reported being infeasible two minutes ago is more likely to remain unfeasible than a stopping place that was reported being infeasible twenty minutes ago.

2. The reason for the stopping place's infeasibility 312. For example, if the stopping place was infeasible because of the presence of another car, then the AV system might expect it to become available later. On the other hand, if the stopping place was infeasible because of construction works, the AV system might not expect that stopping place to become feasible for the rest of the day or for several days. Potentially the AV system could modify the map to reflect that circumstance.

The likelihood that a stopping place that is marked as infeasible in the availability layer might become feasible by the time the AV reaches that stopping place (and vice versa) depends on several factors, including among others: freshness of the information (time elapsed since last update); historical statistics on the level of demand for parking relative to supply in that area at that time of the day; the reason for the infeasibility of that stopping place; and the current traffic volumes around that stopping place (derived from the AV's perception system, potentially supplemented by information from other AVs or sensors). The AV system could use a statistical model 314 that predicts the expected feasibility state of a stopping place (or a similar metric), given some or all of the data points, along with a confidence bound for that estimate. Such a metric could contribute to the calculation of the desirability value of a potential stopping place. A stopping place that is more likely to be available is more desirable than an equivalent stopping place that is less likely to be available.

The availability layer can be updated using information received from other AVs (either directly or through a central cloud server). Therefore, as part of an interconnected fleet of AVs or manually driven vehicles that are equipped with V2V (vehicle-to-vehicle) communication capabilities, the AV might have foreknowledge of which stopping places are available without the AV actually having seen them. The availability layer can also be updated using information from sensors that are fixed (e.g., sensors inside parking garages or sensors monitoring city parking spaces), from crowd-sourced data (e.g., apps such as Waze on which people report construction work, etc.) and from a variety of other sources.

Typically, the AV system executes a trajectory planning process 326 as part of its autonomous capability, which attempts to identify a trajectory from the AV's current position to a specified destination on the drivable area of a map. The result of the trajectory planning process is a continuously updated selected stopping place in the goal region, and a feasible trajectory to reach the currently selected stopping place, if one exists. We emphasize that the trajectory planning process routes the vehicle to the currently selected stopping place, and not the goal position specified by the user or the system, as that may not represent an acceptable and feasible stopping place.

If no feasible trajectory exists to the currently selected stopping place, the trajectory planning process updates its choice of selected stopping place. This may happen, for example, if the approaches to the currently selected stopping place are blocked or cannot accommodate the AV. This trajectory planning process continues as long as the AV has not stopped at the currently selected stopping place. FIG. 12 shows a flowchart of the activities involved in an example of the process of trajectory planning.

The trajectory planning process is executed simultaneously and asynchronously with the AV's perception process 328. As the perception process updates the availability layer, the currently selected stopping places may become unfeasible, for example, because some other vehicle has now occupied one of the stopping places. In addition, it is possible that a more desirable stopping place within the goal region that was previously unavailable, is now available and therefore feasible. Therefore, the trajectory planning process may be forced to update its selected stopping place and the corresponding trajectory to that selected stopping place, multiple times.

The stopping place in the goal region that is selected by the trajectory planning process depends on: (1) feasibility of the acceptable stopping places within the goal region, as determined in real-time by the availability layer via the perception process, (2) the relative desirability of the acceptable stopping places within the goal region, as computed by static or real-time data or both, and (3) the optimization objective of the algorithm that determines the trade-off between coming to a stop sooner versus spending more time to find a more desirable stopping place. Some examples of strategies are:

1. Stop at the first feasible stopping place in the goal region (often called the "greedy" approach).

2. Stop at the most desirable among the currently feasible stopping places in the goal region.

3. If the AV has not stopped at a stopping place within a specified amount of time, stop searching for the most desirable stopping place, and instead find the first available stopping place in the goal region and stop there.

These objectives can be used to effect a trade-off between selecting the best possible stopping place and the time and effort spent in searching for it.

As shown in FIG. 13, in some cases, the AV system may ask the user to choose a stopping place from among a set of stopping places. A touch-based user interface 500 can show the passenger a choice of, for example, three acceptable and feasible stopping places (A, B and C) 520 that are within the proximity region defined around the goal position 510. The user may select from one of the three stopping places by touching the appropriate stopping place. In some instances, the user may be able to select the desired stopping place using a voice command that references the stopping place name, for example, "Stop at A". As mentioned before, the goal region may contain an infinite number of potential stopping places or a finite number which is still too large to present to the passenger. Therefore, the AV system may choose a limited (likely pre-specified) number of stopping places to present to the passenger. These may be stopping places that are relatively desirable and relatively more likely to be available (e.g., the status of the update was updated relatively recently) while being sufficiently different from each other (e.g., non-overlapping).

The user input may be optional, in that the AV system may automatically choose a stopping place if the user does not make a choice within a specified amount of time. When the AV system chooses a stopping place automatically, the selected stopping place may be communicated to the passenger, for example, on a map-based interface on the passenger's mobile device or on a display located in the vehicle. Further, the passenger may be given the choice of changing the system-selected stopping place to one of the passenger's own choosing through an interface, such as the one described for FIG. 13.

As the AV system explores the goal region to select a stopping place, the AV system can revisit stopping places that had been perceived as unfeasible in the hope that they might now be feasible.

The trajectory planning process can communicate with a passenger to keep her informed of the AV's progress. A passenger can be informed that the AV has found an acceptable stopping place or informed when the AV has stopped at a stopping place, or both.

If the AV is unable to stop at an acceptable, feasible stopping place within a specified amount of time, the AV system may adopt strategies to deal with that situation.

Figure 14:
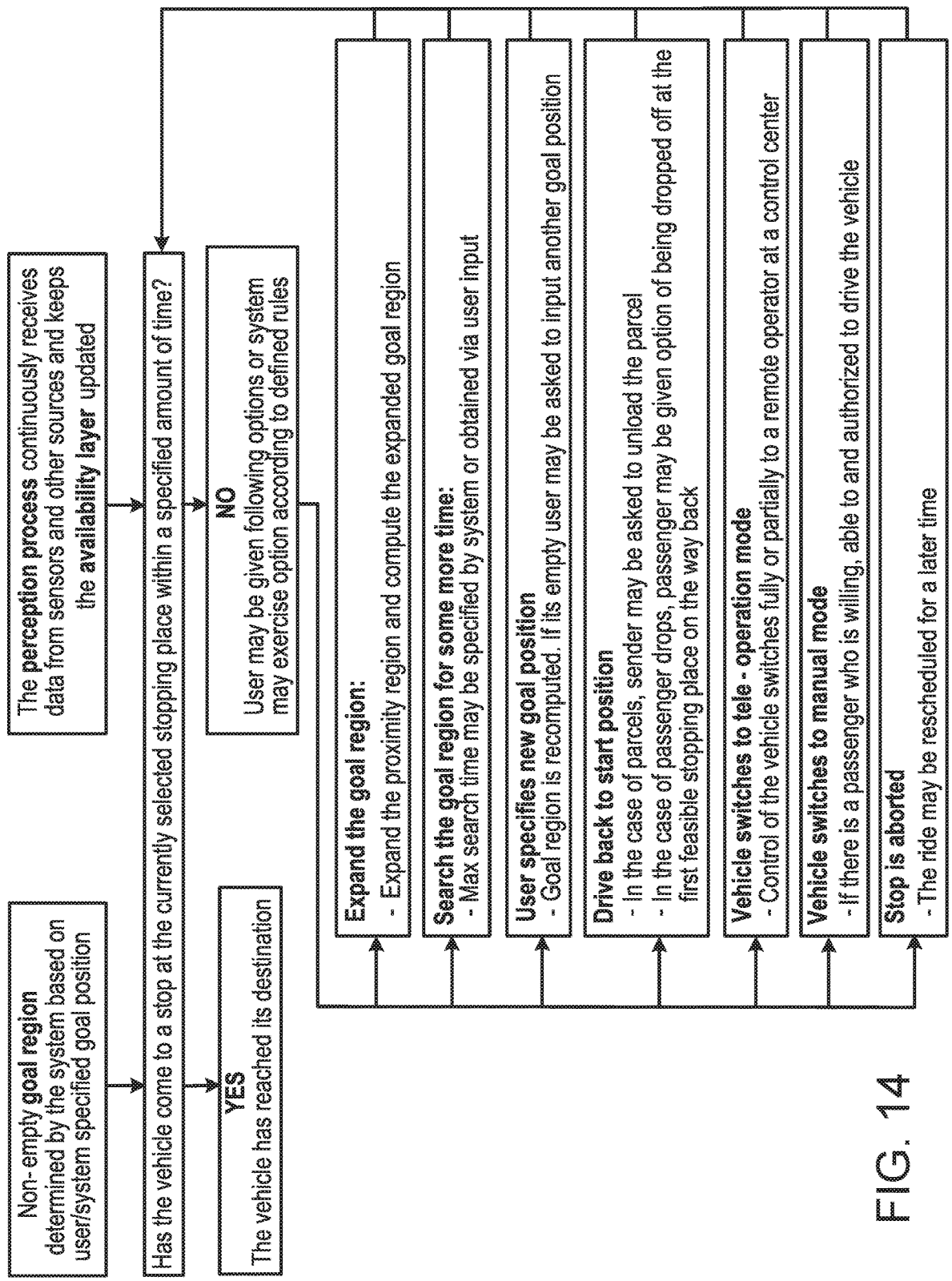

FIG. 14 shows a flowchart of the activities involved in an example of the process of expanding the analysis if the AV cannot come to a stop, including the following:

1. Expand the goal region around the goal position with the understanding that this might require the passenger to walk a greater distance. This may be done automatically by the AV system. The AV system may have stored a specified maximum distance from the goal position that is acceptable for the goal region. The initial proximity region (and goal regions) might include stopping places that are significantly closer to the goal position than this specified maximum distance to enable the AV system to find as close a stopping place as possible. If the initial search does not yield a feasible stopping place, the proximity region (and correspondingly the goal region) may incrementally be expanded to include more stopping places that are farther away from the goal position, but still within the specified maximum distance from the goal position. The passenger may provide information or choices that control the increasing of the size of the proximity region (and correspondingly the goal region) in response to requests posed to the passenger through the user interface (such as a smartphone or a tablet, located in the car or belonging to the user). One of the pieces of information that may be specified by the user, for example, is the maximum distance (or other distance measure) from the goal position that is acceptable to the user. If the system is unable to find a stopping place within this distance, the user may be prompted to increase the specified distance, subject to some specified limit. In some implementations a combination of processes running on the AV system and input from the passenger can be used to control the expansion of the regions.

2. Search the existing goal region again for a specified amount of time in the hope that a stopping space that was previously unavailable is now available. The user may be given the option via a user interface located in the car or on a device belonging to the user, to allow the AV more time to search the goal region, subject to some specified limit.

3. Change the AV's goal position to a new goal position where an acceptable, feasible stopping place may be more easily found. This may be done by the passenger using a user interface similar to what was used to specify the initial goal position. The passenger may have, for example, the option of dropping a pin on a map or typing out an address or searching a location service such as Google Maps.

4. The AV may switch to a tele-operation or remote operation mode in which the control of the operation of the AV switches, partially or fully, from the AV system to a human operator typically located at a central operations control center. Tele-operation systems typically stream live data from the AV to a remote location using wireless transmitters located on the AV. This data may include, but is not limited to, some combination of: (1) raw data from the sensors onboard the AV (for example, a live video stream from the on-board cameras), (2) processed data from the computers on board the AV (for example, data about detected and classified objects, or a rendering of the world around the AV that has been created by fusing data from multiple sensors), (3) data from other systems (for example, outputs from the trajectory planning process), (4) data about the actuators on the AV (such as the throttle, brake, steering), (5) data about the current position, speed, acceleration and orientation of the car from the localization system, and (6) data from the AV's health monitoring system (for example, sensor health, battery status, etc.). This data is typically viewed by a tele-operator or other remote operator who is located at a central operations control center and who can then decide how to drive and otherwise control the AV. The tele-operator may have the ability to control the AV by directly providing inputs to the steering, throttle, brake and other actuators (for example, in the manner in which driver training simulators function). The tele-operator may have the ability to directly control the trajectory planning process by manually selecting a goal position for the vehicle, or influencing the trajectory to the goal position (by specifying the entire trajectory, or providing waypoints, or by some other method). The transition from autonomous to tele-operation mode should be handled with care. Such a transition would normally take place when the AV is not moving, although the AV may not be stopped at an acceptable stopping place. If there is a passenger in the AV, the passenger may be informed about or asked to approve the remote operation. This passenger communication may take place through a user interface in a smartphone belonging to the passenger, or a smartphone or tablet located in the AV, or some other such device.

5. Providing the passenger the option of switching the AV from an autonomous mode to a partially or fully manual mode (if there is a passenger in the AV who is legally authorized and willing to drive it seated in the driver's seat and the AV has a manual mode) so that the passenger may locate an acceptable, feasible stopping place. The transition from autonomous to manual mode should be handled with care. A transition would normally take place when the AV is not moving, although the AV may not be stopped at an acceptable stopping place. The passenger may be informed about the option, and her approval sought, through a user interface in a smartphone belonging to the passenger, or a smartphone or tablet located in the AV, or some other such device. Furthermore, the passenger may be required to ensure that the stopping place chosen manually is one from which the AV can resume autonomous operation after the passenger has exited the AV. A tele-operator may take control of the AV after the passenger has exited the AV, and bring the AV to a position at which autonomous mode may be engaged.

6. In the case of a passenger in the AV, returning toward the known start position and offering to stop at the first feasible stopping place as it travels back toward the start position. This stopping place may or may not be within the goal region.

7. In the case of a parcel in the AV, returning towards the known start position and alerting the sender of the package to unload the package from the AV. Or giving the sender, through a user interface such as a smartphone app, the option of specifying an alternative time when the delivery would be attempted.

8. Aborting the stop. If the stopped activity involves a pickup, the AV system may inform the passenger that a stopping place cannot be found and that the pickup request has been canceled.

Other implementations are also within the scope of the following claims.

The invention claimed is:

1. A computer-implemented method comprising:
receiving, by one or more processors, data identifying one or more potential stopping places for a vehicle within a region;
determining, by the one or more processors, one or more feasible stopping places among the one or more potential stopping places, wherein at least one potential stopping place among the one or more potential stopping places is determined to be a feasible stopping place among the one or more feasible potential stopping places based on:
an amount of time elapsed since the at least one potential stopping place was determined to be infeasible for parking stopping exceeding a first threshold value, and
a reason for the determination that the at least one potential stopping place is infeasible for stopping;
receiving, by the one or more processors, data representing perceptions of conditions at the one or more feasible stopping places, wherein the data representing perceptions of conditions at the one or more currently feasible stopping places is received by the one or more processors from one or more sensors, wherein the one or more sensors comprise at least one sensor that is physically located on the vehicle;
updating, by the one or more processors, data indicative of the one or more feasible stopping places based on the perceptions of conditions to include one or more updated feasible stopping places; and
exposing, by the one or more processors, the updated data to a planning process that selects a stopping place for the vehicle from among the one or more updated feasible stopping places; and
causing, by the one or more processors, the vehicle to drive to the selected stopping place.

2. The method of claim 1, further comprising:
discretizing, by the one or more processors, the one or more potential stopping places as a finite number of points within the region;
defining, by the one or more processors, the at least one potential stopping place as a shape containing at least one of the points, the at least one potential stopping place configured to accommodate a footprint of the vehicle; and
attributing, by the one or more processors, an orientation to the shape, the orientation corresponding to direction of traffic flow at the potential stopping place,
wherein the at least one potential stopping place among the one or more potential stopping places is determined to be a feasible stopping place among the one or more feasible potential stopping places based further on the orientation.

3. The method of claim 2, wherein the data representing perceptions of conditions at the one or more feasible stopping places is received by the one or more processors from one or more sensors;
wherein the method further comprises:
initializing, by the one or more processors, the one or more potential stopping places as one or more stopping places expected to be feasible based on prior data received from the one or more sensors, the prior data representing past perceptions of past conditions at some of the one or more potential stopping places.

4. The method of claim 1, wherein the one or more sensors comprise at least one sensor that is located outside and distant from the vehicle.

5. The method of claim 1, wherein the one or more processors are a part of the vehicle, wherein the one or more processors are communicatively coupled to a central server configured to control the vehicle and one or more other vehicles.

6. The method of claim 1, wherein the data identifying one or more potential stopping places is static map data.

7. The method of claim 1, wherein at least one potential stopping place among the one or more potential stopping places is determined to be the feasible stopping place among the one or more feasible potential stopping places based further on:
at least one of a historical level of demand for parking in a vicinity of the at least one potential stopping place being less than a second threshold value or traffic volume in the vicinity of the at least one potential stopping place being less than a third threshold value.

8. A system comprising:
at least one programmable processor; and
a machine-readable medium storing instructions that, when executed by the at least one processor, cause the at least one programmable processor to perform operations comprising:
receiving data identifying one or more potential stopping places for a vehicle within a region;
determining one or more feasible stopping places among the one or more potential stopping places, wherein at least one potential stopping place among the one or more potential stopping places is determined to be a feasible stopping place among the one or more feasible potential stopping places based on:
an amount of time elapsed since the at least one potential stopping place was determined to be infeasible for parking stopping exceeding a first threshold value, and
a reason for the determination that the at least one potential stopping place is infeasible for stopping;
receiving data representing perceptions of conditions at the one or more feasible stopping places, wherein the data representing perceptions of conditions at the one or more currently feasible stopping places is received by the one or more processors from one or more sensors, wherein the one or more sensors comprise at least one sensor that is physically located on the vehicle; and updating data indicative of the one or more feasible stopping places based on the perceptions of conditions to include one or more updated feasible stopping places; and exposing, by the at least one programmable processor, the updated data to a planning process that selects a stopping place for the vehicle from among the one or more updated feasible stopping places; and causing, by the one or more processors, the vehicle to drive to the selected stopping place.

9. A non-transitory computer program product storing instructions that, when executed by at least one programmable processor, cause the at least one programmable processor to perform operations comprising:

receiving data identifying one or more potential stopping places for a vehicle within a region;

determining one or more feasible stopping places among the one or more potential stopping places, wherein at least one potential stopping place among the one or more potential stopping places is determined to be a feasible stopping place among the one or more feasible potential stopping places based on:

an amount of time elapsed since the at least one potential stopping place was determined to be infeasible for parking stopping exceeding a first threshold value, and a reason for the determination that the at least one potential stopping place is infeasible for stopping;

receiving data representing perceptions of conditions at the one or more feasible stopping places, wherein the data representing perceptions of conditions at the one or more currently feasible stopping places is received by the one or more processors from one or more sensors, wherein the one or more sensors comprise at least one sensor that is physically located on the vehicle;

updating data indicative of the one or more feasible stopping places based on the perceptions of conditions to include one or more updated feasible stopping places; and exposing the updated data to a planning process that selects a stopping place for the vehicle from among the one or more updated feasible stopping places; and causing, by the one or more processors, the vehicle to drive to the selected stopping place.

* * * * *